(12) United States Patent
Lee et al.

(10) Patent No.: US 12,653,097 B2
(45) Date of Patent: Jun. 16, 2026

(54) GARDEN TOOL WITH BLADE COVER

(71) Applicant: TECHTRONIC CORDLESS GP, Anderson, SC (US)

(72) Inventors: Hei Man Lee, Hong Kong (CN); Ho Lam Ng, Hong Kong (CN); Shing Hin Li, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 486 days.

(21) Appl. No.: 18/172,156

(22) Filed: Feb. 21, 2023

(65) Prior Publication Data

US 2023/0263095 A1 Aug. 24, 2023

Related U.S. Application Data

(60) Provisional application No. 63/312,724, filed on Feb. 22, 2022.

(51) Int. Cl.
| | |
|---|---|
| *A01D 34/73* | (2006.01) |
| *A01D 34/00* | (2006.01) |
| *A01D 34/18* | (2006.01) |

(52) U.S. Cl.
CPC ........... *A01D 34/73* (2013.01); *A01D 34/008* (2013.01); *A01D 34/18* (2013.01)

(58) Field of Classification Search
CPC ...... A01D 34/73; A01D 34/008; A01D 34/18; A01D 34/66; A01D 34/733; A01D 34/81; A01D 34/82; A01D 34/84; A01D 75/18
See application file for complete search history.

(56) References Cited

U.S. PATENT DOCUMENTS

| | | | |
|---|---|---|---|
| 923,312 | A | 6/1909 | Alexanderson |
| 2,511,124 | A | 6/1950 | Phelps |
| 2,539,779 | A | 1/1951 | Grosso |
| 2,701,942 | A | 2/1955 | Caldwell, Jr. et al. |

(Continued)

FOREIGN PATENT DOCUMENTS

| | | |
|---|---|---|
| AU | 2006100911 A4 | 11/2006 |
| AU | 2011239326 A1 | 11/2011 |

(Continued)

OTHER PUBLICATIONS

US 8,272,092 B2, 09/2012, Schnittman et al. (withdrawn)

(Continued)

*Primary Examiner* — Joseph M Rocca
*Assistant Examiner* — Jose Antonio Martinez
(74) *Attorney, Agent, or Firm* — Michael Best & Friedrich LLP

(57) ABSTRACT

A rotational cutting blade assembly for use with a garden tool. The rotational cutting blade assembly including a frame defining an axis of rotation and including a blade mounting point, where the blade mounting point includes a cutting boundary, and where the cutting boundary is subdivided into at least one access slot and at least one guard. The rotational cutting blade assembly also including a cutting element configured to be attached to the frame at the blade mounting point, where the cutting element includes at least one cutting edge, and where the at least one cutting edge is immediately adjacent the cutting boundary of the blade mounting point when the cutting element is attached thereto.

17 Claims, 9 Drawing Sheets

(56) References Cited

U.S. PATENT DOCUMENTS

| | | | |
|---|---|---|---|
| 2,751,030 A | 6/1956 | Null | |
| 2,914,902 A | 12/1959 | Beymer | |
| 3,057,140 A | 10/1962 | Amos et al. | |
| 3,147,662 A | 9/1964 | Snook | |
| 3,311,738 A | 3/1967 | Makow | |
| 3,393,598 A | 7/1968 | Bettinger | |
| 3,440,808 A * | 4/1969 | Freedlander | A01D 34/73 |
| | | | 56/295 |
| 3,500,622 A | 3/1970 | Bowen | |
| 3,570,227 A | 3/1971 | Bellinger | |
| 3,612,574 A | 10/1971 | Klopfer et al. | |
| 3,680,295 A | 8/1972 | Rutherford | |
| 3,776,327 A | 12/1973 | Klopfer et al. | |
| 4,065,913 A | 1/1978 | Fisher et al. | |
| 4,126,990 A | 11/1978 | Fisher et al. | |
| 4,126,991 A | 11/1978 | Gobin et al. | |
| 4,165,597 A | 8/1979 | Scanland et al. | |
| 4,205,510 A | 6/1980 | Raniero | |
| 4,268,964 A | 5/1981 | Moore | |
| 4,306,375 A | 12/1981 | Goldfarb et al. | |
| 4,333,202 A | 6/1982 | Block | |
| 4,351,132 A | 9/1982 | Molin | |
| 4,468,884 A | 9/1984 | Goldfarb et al. | |
| 4,492,058 A | 1/1985 | Goldfarb et al. | |
| 4,511,343 A | 4/1985 | Goldfarb et al. | |
| 4,522,606 A | 6/1985 | Goldfarb et al. | |
| 4,547,166 A | 10/1985 | Goldfarb et al. | |
| 4,591,347 A | 5/1986 | Goldfarb et al. | |
| 4,596,412 A | 6/1986 | Everett et al. | |
| 4,627,563 A | 12/1986 | Meyer | |
| 4,652,247 A | 3/1987 | Goldfarb et al. | |
| 4,673,370 A | 6/1987 | Goldfarb et al. | |
| 4,693,656 A | 9/1987 | Guthrie | |
| 4,787,794 A | 11/1988 | Guthrie | |
| 4,826,066 A | 5/1989 | Koester et al. | |
| 4,902,260 A | 2/1990 | Im | |
| 4,916,813 A | 4/1990 | Elia | |
| 4,951,985 A | 8/1990 | Pong et al. | |
| 4,958,068 A | 9/1990 | Pong et al. | |
| 4,962,453 A | 10/1990 | Pong, Jr. et al. | |
| 4,964,265 A | 10/1990 | Young | |
| 4,968,878 A | 11/1990 | Pong et al. | |
| 5,019,113 A * | 5/1991 | Burnell | A01D 34/733 |
| | | | 56/DIG. 17 |
| 5,024,728 A | 6/1991 | Morita et al. | |
| 5,025,969 A | 6/1991 | Koester et al. | |
| 5,323,593 A | 6/1994 | Cline et al. | |
| 5,363,633 A | 11/1994 | Masaru | |
| 5,402,110 A | 3/1995 | Oliver et al. | |
| 5,406,778 A | 4/1995 | Lamb et al. | |
| 5,507,137 A | 4/1996 | Norris | |
| 5,540,037 A | 7/1996 | Lamb et al. | |
| 5,548,278 A | 8/1996 | Oliver et al. | |
| 5,553,445 A | 9/1996 | Lamb et al. | |
| 5,561,972 A | 10/1996 | Rolfe | |
| 5,572,856 A | 11/1996 | Ku | |
| 5,577,868 A | 11/1996 | Chen | |
| 5,703,569 A | 12/1997 | Oliver et al. | |
| 5,785,480 A | 7/1998 | Difeo | |
| 5,821,731 A | 10/1998 | Kuki et al. | |
| 5,850,135 A | 12/1998 | Kuki et al. | |
| 5,916,111 A | 6/1999 | Colens | |
| 5,942,869 A | 8/1999 | Katou et al. | |
| 6,076,025 A | 6/2000 | Ueno et al. | |
| 6,101,795 A | 8/2000 | Diekhans | |
| 6,212,917 B1 | 4/2001 | Rathbun | |
| 6,255,793 B1 | 7/2001 | Peless et al. | |
| 6,300,737 B1 | 10/2001 | Bergvall et al. | |
| 6,321,515 B1 | 11/2001 | Colens | |
| D451,931 S | 12/2001 | Abramson et al. | |
| 6,338,013 B1 | 1/2002 | Ruffner | |
| 6,339,735 B1 | 1/2002 | Peless et al. | |
| 6,417,641 B2 | 7/2002 | Peless et al. | |
| 6,442,845 B2 | 9/2002 | Wheeler et al. | |
| 6,443,509 B1 | 9/2002 | Levin et al. | |
| 6,460,253 B1 | 10/2002 | Wheeler et al. | |
| 6,465,982 B1 | 10/2002 | Bergvall et al. | |
| 6,481,515 B1 | 11/2002 | Kirkpatrick et al. | |
| 6,493,613 B2 | 12/2002 | Peless et al. | |
| 6,502,017 B2 | 12/2002 | Ruffner | |
| 6,525,509 B1 | 2/2003 | Petersson et al. | |
| 6,586,908 B2 | 7/2003 | Petersson et al. | |
| 6,594,844 B2 | 7/2003 | Jones | |
| 6,600,981 B2 | 7/2003 | Ruffner | |
| 6,604,348 B2 | 8/2003 | Hunt | |
| 6,611,738 B2 | 8/2003 | Ruffner | |
| 6,615,108 B1 | 9/2003 | Peless et al. | |
| 6,636,847 B1 | 10/2003 | Spires | |
| 6,650,975 B2 | 11/2003 | Ruffner | |
| 6,662,889 B2 | 12/2003 | De Fazio et al. | |
| 6,728,607 B1 | 4/2004 | Anderson | |
| 6,763,282 B2 | 7/2004 | Glenn et al. | |
| 6,779,217 B2 | 8/2004 | Fisher | |
| 6,809,490 B2 | 10/2004 | Jones et al. | |
| 6,813,557 B2 | 11/2004 | Schmidt et al. | |
| 6,850,024 B2 | 2/2005 | Peless et al. | |
| 6,870,792 B2 | 3/2005 | Chiappetta | |
| 6,879,878 B2 | 4/2005 | Glenn et al. | |
| 6,885,912 B2 | 4/2005 | Peless et al. | |
| 6,907,336 B2 | 6/2005 | Gray et al. | |
| 6,934,615 B2 | 8/2005 | Flann et al. | |
| 6,984,952 B2 | 1/2006 | Peless et al. | |
| 7,010,425 B2 | 3/2006 | Gray et al. | |
| 7,024,842 B2 | 4/2006 | Hunt et al. | |
| 7,024,843 B2 | 4/2006 | Hunt et al. | |
| 7,047,712 B1 | 5/2006 | Hunt et al. | |
| 7,053,580 B2 | 5/2006 | Aldred | |
| 7,069,111 B2 | 6/2006 | Glenn et al. | |
| 7,076,348 B2 | 7/2006 | Bucher et al. | |
| 7,079,923 B2 | 7/2006 | Abramson et al. | |
| 7,079,943 B2 | 7/2006 | Flann et al. | |
| 7,085,624 B2 | 8/2006 | Aldred et al. | |
| 7,103,457 B2 | 9/2006 | Dean | |
| 7,110,881 B2 | 9/2006 | Gray et al. | |
| 7,114,318 B2 | 10/2006 | Poulson et al. | |
| 7,117,660 B1 | 10/2006 | Colens | |
| 7,133,746 B2 | 11/2006 | Abramson et al. | |
| 7,146,786 B2 | 12/2006 | Brandon | |
| 7,155,308 B2 | 12/2006 | Jones | |
| 7,155,309 B2 | 12/2006 | Peless et al. | |
| 7,166,983 B2 | 1/2007 | Jung | |
| 7,167,775 B2 | 1/2007 | Abramson et al. | |
| 7,173,391 B2 | 2/2007 | Jones et al. | |
| 7,174,157 B2 | 2/2007 | Gassho et al. | |
| 7,211,980 B1 | 5/2007 | Bruemmer et al. | |
| 7,216,033 B2 | 5/2007 | Flann et al. | |
| 7,227,334 B2 | 6/2007 | Yang et al. | |
| 7,228,214 B2 | 6/2007 | Flann et al. | |
| 7,233,683 B2 | 6/2007 | Han et al. | |
| 7,242,791 B2 | 7/2007 | Han et al. | |
| 7,286,902 B2 | 10/2007 | Kim et al. | |
| D559,867 S | 1/2008 | Abramson | |
| 7,332,890 B2 | 2/2008 | Cohen et al. | |
| 7,349,759 B2 | 3/2008 | Peless et al. | |
| 7,363,994 B1 | 4/2008 | Defazio et al. | |
| 7,369,460 B2 | 5/2008 | Chiappetta et al. | |
| 7,369,924 B2 | 5/2008 | Han et al. | |
| 7,388,343 B2 | 6/2008 | Jones et al. | |
| D573,610 S | 7/2008 | Abramson | |
| 7,395,648 B1 | 7/2008 | Silbernagel et al. | |
| 7,418,328 B2 | 8/2008 | Romig | |
| 7,429,843 B2 | 9/2008 | Jones et al. | |
| 7,430,455 B2 | 9/2008 | Casey et al. | |
| 7,444,214 B2 | 10/2008 | Cho et al. | |
| 7,469,525 B2 | 12/2008 | Zeigler et al. | |
| 7,474,941 B2 | 1/2009 | Kim et al. | |
| 7,480,958 B2 | 1/2009 | Song et al. | |
| 7,480,960 B2 | 1/2009 | Kim | |
| 7,497,053 B2 | 3/2009 | Nicolet | |
| 7,499,774 B2 | 3/2009 | Barrett et al. | |
| 7,499,775 B2 | 3/2009 | Filippov et al. | |
| 7,499,776 B2 | 3/2009 | Allard et al. | |
| 7,499,804 B2 | 3/2009 | Svendsen et al. | |
| 7,505,848 B2 | 3/2009 | Flann et al. | |

(56) References Cited

U.S. PATENT DOCUMENTS

| | | | |
|---|---|---|---|
| 7,539,557 | B2 | 5/2009 | Yamauchi |
| 7,568,873 | B1 | 8/2009 | Rambo |
| 7,574,282 | B2 | 8/2009 | Petersson et al. |
| 7,577,499 | B2 | 8/2009 | Sun et al. |
| 7,587,260 | B2 | 9/2009 | Bruemmer et al. |
| 7,590,413 | B2 | 9/2009 | May |
| 7,596,934 | B2 | 10/2009 | Waesche et al. |
| 7,610,122 | B2 | 10/2009 | Anderson |
| 7,610,123 | B2 | 10/2009 | Han et al. |
| 7,613,543 | B2 | 11/2009 | Petersson et al. |
| 7,614,835 | B2 | 11/2009 | Kitamura |
| 7,617,890 | B2 | 11/2009 | Romig |
| 7,647,144 | B2 | 1/2010 | Haegermarck |
| D610,072 | S | 2/2010 | Wallet et al. |
| 7,663,333 | B2 | 2/2010 | Jones et al. |
| 7,688,676 | B2 | 3/2010 | Chiappetta et al. |
| 7,690,066 | B2 | 4/2010 | Stoltz et al. |
| D615,920 | S | 5/2010 | Kline et al. |
| 7,707,812 | B2 | 5/2010 | Cheung |
| 7,720,572 | B2 | 5/2010 | Ziegler et al. |
| 7,729,801 | B2 | 6/2010 | Abramson |
| 7,730,705 | B2 | 6/2010 | Kubinski |
| 7,769,490 | B2 | 8/2010 | Abramson et al. |
| 7,787,989 | B2 | 8/2010 | Colens |
| 7,792,607 | B2 | 9/2010 | Han et al. |
| 7,801,645 | B2 | 9/2010 | Taylor et al. |
| 7,805,220 | B2 | 9/2010 | Taylor et al. |
| 7,805,676 | B2 | 9/2010 | Schemers et al. |
| 7,805,918 | B2 | 10/2010 | Silbernagel et al. |
| D628,145 | S | 11/2010 | Vaidya |
| 7,840,210 | B2 | 11/2010 | May |
| 7,843,431 | B2 | 11/2010 | Robbins et al. |
| 7,844,396 | B2 | 11/2010 | Zeitzew |
| 7,853,373 | B2 | 12/2010 | Traster et al. |
| 7,876,927 | B2 | 1/2011 | Han et al. |
| 7,885,738 | B2 | 2/2011 | Park et al. |
| 7,908,834 | B2 | 3/2011 | Keski-Luopa |
| 7,929,504 | B2 | 4/2011 | Wentink et al. |
| 7,953,526 | B2 | 5/2011 | Durkos et al. |
| 7,957,837 | B2 | 6/2011 | Ziegler et al. |
| 7,957,850 | B2 | 6/2011 | Anderson |
| 7,958,709 | B2 | 6/2011 | Coleman et al. |
| 7,958,712 | B2 | 6/2011 | Cheung |
| 7,979,175 | B2 | 7/2011 | Allard et al. |
| 7,992,251 | B2 | 8/2011 | Chung et al. |
| 8,020,657 | B2 | 9/2011 | Allard et al. |
| 8,022,667 | B2 | 9/2011 | Anderson |
| 8,031,086 | B2 | 10/2011 | Thacher et al. |
| 8,046,103 | B2 | 10/2011 | Abramson et al. |
| 8,065,866 | B2 | 11/2011 | Tamas et al. |
| 8,078,338 | B2 | 12/2011 | Pack et al. |
| 8,079,433 | B2 | 12/2011 | Teague et al. |
| D652,431 | S | 1/2012 | Näslund |
| 8,091,105 | B2 | 1/2012 | Lee |
| 8,106,626 | B2 | 1/2012 | Li et al. |
| 8,107,318 | B2 | 1/2012 | Chiappetta et al. |
| 8,108,092 | B2 | 1/2012 | Phillips et al. |
| 8,121,730 | B2 | 2/2012 | Sung et al. |
| D656,163 | S | 3/2012 | Johansson et al. |
| 8,135,498 | B2 | 3/2012 | Hyung et al. |
| 8,150,574 | B2 | 4/2012 | Han et al. |
| 8,195,333 | B2 | 6/2012 | Ziegler et al. |
| 8,195,342 | B2 | 6/2012 | Anderson |
| 8,195,358 | B2 | 6/2012 | Anderson |
| 8,199,109 | B2 | 6/2012 | Robbins et al. |
| 8,200,428 | B2 | 6/2012 | Anderson |
| 8,208,907 | B2 | 6/2012 | May |
| 8,209,053 | B2 | 6/2012 | Kim et al. |
| 8,224,500 | B2 | 7/2012 | Anderson |
| 8,224,516 | B2 | 7/2012 | Anderson |
| 8,229,618 | B2 | 7/2012 | Tolstedt et al. |
| 8,234,010 | B2 | 7/2012 | Thompson et al. |
| 8,234,848 | B2 | 8/2012 | Messina et al. |
| 8,237,389 | B2 | 8/2012 | Fitch et al. |
| 8,239,992 | B2 | 8/2012 | Schnittman et al. |
| 8,255,092 | B2 | 8/2012 | Phillips et al. |
| 8,271,132 | B2 | 9/2012 | Nielsen et al. |
| 8,292,007 | B2 | 10/2012 | Defazio et al. |
| 8,295,125 | B2 | 10/2012 | Chiappetta et al. |
| 8,295,979 | B2 | 10/2012 | Thacher et al. |
| 8,297,032 | B2 | 10/2012 | Ninomiya et al. |
| 8,297,903 | B2 | 10/2012 | Hohmann et al. |
| 8,306,659 | B2 | 11/2012 | Abramson et al. |
| 8,311,674 | B2 | 11/2012 | Abramson |
| 8,326,469 | B2 | 12/2012 | Phillips et al. |
| 8,336,282 | B2 | 12/2012 | Messina et al. |
| 8,340,438 | B2 | 12/2012 | Anderson |
| 8,347,444 | B2 | 1/2013 | Schnittman et al. |
| 8,350,810 | B2 | 1/2013 | Robbins et al. |
| 8,352,113 | B2 | 1/2013 | Johnson et al. |
| 8,370,985 | B2 | 2/2013 | Schnittman et al. |
| 8,390,251 | B2 | 3/2013 | Cohen et al. |
| 8,392,044 | B2 | 3/2013 | Thompson et al. |
| 8,392,065 | B2 | 3/2013 | Tolstedt et al. |
| 8,396,592 | B2 | 3/2013 | Jones et al. |
| 8,396,597 | B2 | 3/2013 | Anderson |
| 8,396,611 | B2 | 3/2013 | Phillips et al. |
| D679,294 | S | 4/2013 | Tajik et al. |
| D679,295 | S | 4/2013 | Tajik et al. |
| 8,412,377 | B2 | 4/2013 | Casey et al. |
| 8,428,776 | B2 | 4/2013 | Letsky |
| 8,433,468 | B2 | 4/2013 | Johnson et al. |
| 8,438,695 | B2 | 5/2013 | Gilbert, Jr. et al. |
| 8,442,700 | B2 | 5/2013 | Anderson |
| 8,447,440 | B2 | 5/2013 | Phillips et al. |
| 8,447,454 | B2 | 5/2013 | Biber et al. |
| 8,461,803 | B2 | 6/2013 | Cohen et al. |
| 8,463,438 | B2 | 6/2013 | Jones et al. |
| 8,467,928 | B2 | 6/2013 | Anderson |
| 8,471,133 | B1 | 6/2013 | Lin |
| 8,473,187 | B2 | 6/2013 | Kammel et al. |
| 8,476,867 | B2 | 7/2013 | Li et al. |
| 8,478,442 | B2 | 7/2013 | Casey et al. |
| 8,498,788 | B2 | 7/2013 | Kondekar |
| D688,276 | S | 8/2013 | Näslund |
| 8,508,329 | B2 | 8/2013 | Veenstra |
| 8,521,329 | B2 | 8/2013 | Park et al. |
| 8,532,821 | B2 | 9/2013 | Ko |
| 8,532,822 | B2 | 9/2013 | Abramson et al. |
| 8,560,145 | B2 | 10/2013 | Anderson |
| 8,565,920 | B2 | 10/2013 | Casey et al. |
| 8,572,266 | B2 | 10/2013 | Larocca |
| 8,577,517 | B2 | 11/2013 | Phillips et al. |
| 8,577,538 | B2 | 11/2013 | Lenser et al. |
| 8,594,842 | B2 | 11/2013 | Abramson |
| 8,599,645 | B2 | 12/2013 | Chiappetta et al. |
| 8,619,141 | B2 | 12/2013 | Anderson |
| 8,634,960 | B2 | 1/2014 | Sandin et al. |
| 8,635,015 | B2 | 1/2014 | Anderson |
| 8,655,539 | B2 | 2/2014 | Yoo et al. |
| 8,660,879 | B2 | 2/2014 | Machtelinck |
| 8,666,550 | B2 | 3/2014 | Anderson et al. |
| 8,666,554 | B2 | 3/2014 | Anderson |
| 8,666,587 | B2 | 3/2014 | Anderson |
| 8,671,656 | B2 | 3/2014 | Paden |
| 8,676,378 | B2 | 3/2014 | Tian et al. |
| 8,706,339 | B2 | 4/2014 | Thompson et al. |
| 8,712,623 | B2 | 4/2014 | Sato et al. |
| 8,725,316 | B2 | 5/2014 | Thompson et al. |
| 8,726,454 | B2 | 5/2014 | Gilbert, Jr. et al. |
| 8,731,295 | B2 | 5/2014 | Schepelmann et al. |
| 8,739,057 | B2 | 5/2014 | Cheong et al. |
| 8,744,626 | B2 | 6/2014 | Johnson et al. |
| 8,744,663 | B2 | 6/2014 | Sato et al. |
| 8,749,196 | B2 | 6/2014 | Cohen et al. |
| 8,760,397 | B2 | 6/2014 | Robbins et al. |
| 8,761,935 | B2 | 6/2014 | Casey et al. |
| 8,781,627 | B2 | 7/2014 | Sandin et al. |
| 8,788,092 | B2 | 7/2014 | Casey et al. |
| 8,818,567 | B2 | 8/2014 | Anderson |
| 8,818,602 | B2 | 8/2014 | Yamamura et al. |
| 8,838,274 | B2 | 9/2014 | Jones et al. |
| 8,838,291 | B2 | 9/2014 | Jägenstedt et al. |
| 8,839,477 | B2 | 9/2014 | Schnittman et al. |

(56)　　　　　　References Cited

U.S. PATENT DOCUMENTS

| | | | |
|---|---|---|---|
| 8,843,244 | B2 | 9/2014 | Phillips et al. |
| 8,854,001 | B2 | 10/2014 | Cohen et al. |
| 8,856,150 | B2 | 10/2014 | Machtelinck |
| 8,868,237 | B2 | 10/2014 | Sandin et al. |
| 8,869,337 | B2 | 10/2014 | Sumonthee |
| 8,869,369 | B1 | 10/2014 | Roach |
| 8,874,269 | B2 | 10/2014 | Biber et al. |
| 8,874,300 | B2 | 10/2014 | Allard et al. |
| D718,339 | S | 11/2014 | Damshak et al. |
| D718,340 | S | 11/2014 | Damshak et al. |
| D718,341 | S | 11/2014 | Gur et al. |
| 8,892,352 | B2 | 11/2014 | Petereit et al. |
| D718,793 | S | 12/2014 | Gur et al. |
| 8,911,192 | B2 | 12/2014 | Hohmann et al. |
| 8,918,241 | B2 | 12/2014 | Chen et al. |
| 8,925,667 | B2 | 1/2015 | Chen |
| 8,930,023 | B2 | 1/2015 | Gutmann et al. |
| 8,930,024 | B2 | 1/2015 | Abramson |
| 8,938,318 | B2 | 1/2015 | Bergström et al. |
| 8,942,862 | B2 | 1/2015 | Markusson et al. |
| 8,954,193 | B2 | 2/2015 | Sandin et al. |
| 8,958,911 | B2 | 2/2015 | Wong et al. |
| 8,958,939 | B2 | 2/2015 | Einecke et al. |
| 8,965,578 | B2 | 2/2015 | Versteeg et al. |
| 8,989,946 | B2 | 3/2015 | Anderson |
| 8,989,972 | B2 | 3/2015 | Anderson |
| 8,996,171 | B2 | 3/2015 | Anderson et al. |
| 8,996,177 | B2 | 3/2015 | Coenen |
| D729,280 | S | 5/2015 | Näslund et al. |
| 9,021,777 | B2 | 5/2015 | Johnson et al. |
| 9,026,299 | B2 | 5/2015 | Johnson et al. |
| 9,026,302 | B2 | 5/2015 | Stout et al. |
| 9,031,050 | B2 | 5/2015 | Cherian et al. |
| 9,037,294 | B2 | 5/2015 | Chung et al. |
| 9,043,016 | B2 | 5/2015 | Filippov et al. |
| 9,043,129 | B2 | 5/2015 | Bonefas et al. |
| D731,402 | S | 6/2015 | Tedesco et al. |
| 9,043,952 | B2 | 6/2015 | Sandin et al. |
| 9,043,953 | B2 | 6/2015 | Sandin et al. |
| 9,072,218 | B2 | 7/2015 | Johnson et al. |
| 9,072,219 | B2 | 7/2015 | Da Rocha et al. |
| 9,079,303 | B2 | 7/2015 | Abramson et al. |
| 9,093,868 | B2 | 7/2015 | Baxter |
| 9,104,204 | B2 | 8/2015 | Jones et al. |
| 9,104,206 | B2 | 8/2015 | Biber et al. |
| 9,110,471 | B2 | 8/2015 | Pack et al. |
| 9,113,595 | B2 | 8/2015 | Roth et al. |
| 9,119,341 | B2 | 9/2015 | Jägenstedt |
| 9,137,943 | B2 | 9/2015 | Einecke et al. |
| 9,144,193 | B2 | 9/2015 | Paden |
| 9,182,763 | B2 | 11/2015 | Park et al. |
| 9,186,800 | B2 | 11/2015 | Shin et al. |
| 9,188,980 | B2 | 11/2015 | Anderson |
| 9,188,983 | B2 | 11/2015 | Stout et al. |
| 9,195,256 | B2 | 11/2015 | Robbins et al. |
| D745,897 | S | 12/2015 | Mehra et al. |
| 9,213,934 | B1 | 12/2015 | Versteeg et al. |
| 9,215,957 | B2 | 12/2015 | Cohen et al. |
| 9,223,312 | B2 | 12/2015 | Goel et al. |
| 9,232,692 | B2 | 1/2016 | Björn et al. |
| 9,235,214 | B2 | 1/2016 | Anderson |
| 9,236,637 | B2 | 1/2016 | Anderson |
| 9,241,441 | B2 | 1/2016 | Björn et al. |
| D748,568 | S | 2/2016 | Helin et al. |
| 9,258,942 | B2 | 2/2016 | Biber et al. |
| 9,268,331 | B2 | 2/2016 | Abramson et al. |
| 9,276,419 | B2 | 3/2016 | Borinato et al. |
| 9,278,690 | B2 | 3/2016 | Smith |
| 9,301,444 | B2 | 4/2016 | Campbell et al. |
| D757,637 | S | 5/2016 | Horowitz |
| 9,327,407 | B2 | 5/2016 | Jones et al. |
| 9,335,767 | B2 | 5/2016 | Jang et al. |
| 9,338,130 | B2 | 5/2016 | Von Huben et al. |
| 9,348,897 | B2 | 5/2016 | Shoham et al. |
| 9,349,187 | B2 | 5/2016 | Schepelmann et al. |
| D758,455 | S | 6/2016 | Maibach et al. |
| D759,577 | S | 6/2016 | Wang et al. |
| 9,357,699 | B2 | 6/2016 | Elonsson |
| 9,363,945 | B2 | 6/2016 | Jägenstedt et al. |
| 9,375,842 | B2 | 6/2016 | Shamlian et al. |
| 9,376,027 | B2 | 6/2016 | Harris |
| D760,806 | S | 7/2016 | Cmich et al. |
| 9,380,742 | B2 | 7/2016 | Biber et al. |
| 9,405,294 | B2 | 8/2016 | Jägenstedt et al. |
| 9,412,515 | B2 | 8/2016 | Hyde et al. |
| 9,419,453 | B2 | 8/2016 | Andersson et al. |
| 9,420,741 | B2 | 8/2016 | Balutis et al. |
| 9,421,879 | B2 | 8/2016 | Pastoor et al. |
| 9,426,946 | B2 | 8/2016 | Fisher |
| 9,429,950 | B2 | 8/2016 | Sjöholm |
| 9,436,185 | B2 | 9/2016 | Schnittman |
| 9,439,348 | B2 | 9/2016 | Biber et al. |
| 9,439,367 | B2 | 9/2016 | Abhyanker |
| 9,440,350 | B2 | 9/2016 | Mou et al. |
| 9,440,354 | B2 | 9/2016 | Gutmann et al. |
| 9,446,521 | B2 | 9/2016 | Casey et al. |
| 9,452,525 | B2 | 9/2016 | Ziegler et al. |
| 9,452,685 | B2 | 9/2016 | Hyde et al. |
| D769,180 | S | 10/2016 | Wang et al. |
| 9,456,545 | B2 | 10/2016 | Biber |
| 9,457,677 | B2 | 10/2016 | Hyde et al. |
| 9,463,704 | B2 | 10/2016 | Hyde et al. |
| 9,471,063 | B2 | 10/2016 | Ouyang |
| 9,480,201 | B2 | 11/2016 | Maruyama et al. |
| 9,483,055 | B2 | 11/2016 | Johnson et al. |
| 9,491,904 | B2 | 11/2016 | Jägenstedt et al. |
| 9,497,901 | B2 | 11/2016 | Willgert |
| 9,505,140 | B1 | 11/2016 | Fay et al. |
| 9,510,505 | B2 | 12/2016 | Halloran et al. |
| 9,516,806 | B2 | 12/2016 | Yamauchi et al. |
| D776,169 | S | 1/2017 | Cmich et al. |
| 9,532,688 | B1 | 1/2017 | Ebrahimi Afrouzi et al. |
| 9,538,702 | B2 | 1/2017 | Balutis et al. |
| 9,543,680 | B2 | 1/2017 | Elonsson |
| 9,545,032 | B2 | 1/2017 | Baer et al. |
| 9,550,294 | B2 | 1/2017 | Cohen et al. |
| 9,554,508 | B2 | 1/2017 | Balutis et al. |
| 9,559,461 | B1 | 1/2017 | Diehr |
| 9,560,800 | B2 | 2/2017 | Reichen et al. |
| 9,563,204 | B2 | 2/2017 | Willgert |
| 9,573,275 | B2 | 2/2017 | Reigo et al. |
| D781,349 | S | 3/2017 | Cmich |
| D781,926 | S | 3/2017 | Al-Hashimi et al. |
| 9,586,563 | B2 | 3/2017 | Kanai et al. |
| 9,590,862 | B2 | 3/2017 | Larocca |
| 9,606,541 | B2 | 3/2017 | Abramson |
| 9,622,399 | B2 | 4/2017 | Kremmer et al. |
| 9,623,557 | B2 | 4/2017 | Gutmann et al. |
| 9,630,319 | B2 | 4/2017 | Vicenti |
| 9,632,489 | B2 | 4/2017 | Biber et al. |
| 9,699,964 | B2 | 7/2017 | Roth et al. |
| 9,701,020 | B1 | 7/2017 | Ebrahimi Afrouzi |
| 9,711,767 | B2 | 7/2017 | Juenger et al. |
| 9,713,302 | B2 | 7/2017 | Sandin et al. |
| 9,713,303 | B2 | 7/2017 | Jägenstedt et al. |
| D794,089 | S | 8/2017 | Maibach et al. |
| 9,717,175 | B2 | 8/2017 | Fay, II et al. |
| 9,720,417 | B2 | 8/2017 | Reigo et al. |
| 9,723,782 | B2 | 8/2017 | Roth et al. |
| 9,736,981 | B2 | 8/2017 | Roth et al. |
| 9,740,210 | B2 | 8/2017 | Sjöholm |
| D796,555 | S | 9/2017 | Landberg et al. |
| D797,530 | S | 9/2017 | Cmich |
| 9,750,183 | B2 | 9/2017 | Haun |
| 9,766,627 | B2 | 9/2017 | Jägenstedt et al. |
| D799,555 | S | 10/2017 | Cmich |
| 9,785,148 | B2 | 10/2017 | Yun |
| 9,788,481 | B2 | 10/2017 | Das et al. |
| 9,788,483 | B2 | 10/2017 | Roth et al. |
| 9,791,860 | B2 | 10/2017 | Phillips et al. |
| 9,804,604 | B2 | 10/2017 | Mattsson et al. |
| 9,807,925 | B2 | 11/2017 | Johnson |
| 9,807,930 | B1 | 11/2017 | Lydon et al. |
| 9,817,398 | B2 | 11/2017 | Yamamura et al. |

(56)　　　　　References Cited

U.S. PATENT DOCUMENTS

| | | | |
|---|---|---|---|
| 9,820,433 | B2 | 11/2017 | Borinato |
| 9,826,678 | B2 | 11/2017 | Balutis et al. |
| 9,829,891 | B2 | 11/2017 | Smith et al. |
| 9,841,768 | B2 | 12/2017 | Hiramatsu et al. |
| 9,844,876 | B2 | 12/2017 | Chung et al. |
| 9,848,529 | B2 | 12/2017 | Franzius et al. |
| 9,848,532 | B2 | 12/2017 | Keski-Luopa et al. |
| 9,851,718 | B2 | 12/2017 | Booher |
| 9,853,468 | B2 | 12/2017 | Ireland |
| D807,281 | S | 1/2018 | Irwin et al. |
| D807,811 | S | 1/2018 | Wang et al. |
| 9,854,737 | B2 | 1/2018 | Yamauchi et al. |
| 9,854,956 | B2 | 1/2018 | Song et al. |
| 9,857,025 | B2 | 1/2018 | Gottinger et al. |
| 9,861,035 | B2 | 1/2018 | Kruckeberg et al. |
| 9,872,437 | B2 | 1/2018 | Markusson et al. |
| 9,874,876 | B2 | 1/2018 | Shimamura |
| 9,876,370 | B2 | 1/2018 | Yamamura et al. |
| D810,664 | S | 2/2018 | Sgreccia et al. |
| D810,665 | S | 2/2018 | Sgreccia et al. |
| 9,884,423 | B2 | 2/2018 | Cohen et al. |
| 9,894,836 | B2 | 2/2018 | Garton |
| 9,895,808 | B2 | 2/2018 | Stout et al. |
| 9,901,028 | B2 | 2/2018 | Hans |
| 9,903,947 | B2 | 2/2018 | Das et al. |
| 9,924,632 | B2 | 3/2018 | Chenevert et al. |
| 9,924,847 | B2 | 3/2018 | Gottinger et al. |
| 9,931,007 | B2 | 4/2018 | Morin et al. |
| 9,931,008 | B2 | 4/2018 | Yoo et al. |
| 9,931,750 | B2 | 4/2018 | Cohen et al. |
| 9,936,635 | B2 | 4/2018 | Gottinger et al. |
| 9,968,024 | B2 | 5/2018 | Haneda et al. |
| 9,972,098 | B1 | 5/2018 | Ebrahimi Afrouzi et al. |
| 9,983,586 | B2 | 5/2018 | Borinato |
| 10,011,180 | B2 | 7/2018 | Hyde et al. |
| 10,021,830 | B2 | 7/2018 | Doughty |
| 10,024,964 | B2 | 7/2018 | Pierce et al. |
| 10,029,368 | B2 | 7/2018 | Wolowelsky et al. |
| 10,031,527 | B2 | 7/2018 | Björn |
| 10,034,421 | B2 | 7/2018 | Doughty et al. |
| 10,035,270 | B2 | 7/2018 | Fay et al. |
| 10,037,038 | B2 | 7/2018 | Sandin et al. |
| 10,046,130 | B2 | 8/2018 | Molden et al. |
| 10,054,924 | B2 | 8/2018 | Willgert |
| 10,057,813 | B1 | 8/2018 | Likar et al. |
| 10,067,232 | B2 | 9/2018 | Halloran et al. |
| 10,070,764 | B2 | 9/2018 | Schnittman et al. |
| 10,071,475 | B2 | 9/2018 | Lin et al. |
| 10,078,336 | B2 | 9/2018 | Reigo et al. |
| 10,080,326 | B2 | 9/2018 | Yamamura et al. |
| D830,418 | S | 10/2018 | Näslund et al. |
| 10,091,930 | B2 | 10/2018 | Balutis et al. |
| 10,093,194 | B2 | 10/2018 | Hyde et al. |
| 10,093,259 | B2 | 10/2018 | Pan |
| 10,098,277 | B2 | 10/2018 | Ouyang |
| 10,104,835 | B2 | 10/2018 | Köhler et al. |
| 10,105,838 | B2 | 10/2018 | Mou et al. |
| 10,108,198 | B2 | 10/2018 | Björn et al. |
| D834,185 | S | 11/2018 | Molden et al. |
| D834,504 | S | 11/2018 | Ropars |
| D834,505 | S | 11/2018 | Wang et al. |
| 10,117,379 | B2 | 11/2018 | Guiet et al. |
| 10,123,479 | B2 | 11/2018 | Ladd, Jr. et al. |
| 10,124,494 | B2 | 11/2018 | Outa et al. |
| 10,131,057 | B2 | 11/2018 | Patel et al. |
| 10,136,576 | B2 | 11/2018 | Reigo |
| 10,149,430 | B2 | 12/2018 | Bergström et al. |
| 10,152,062 | B2 | 12/2018 | Schnittman |
| 10,157,334 | B2 | 12/2018 | Schepelmann et al. |
| 10,159,180 | B2 | 12/2018 | Balutis et al. |
| 10,162,359 | B2 | 12/2018 | Johnson et al. |
| D837,150 | S | 1/2019 | Näslund et al. |
| 10,165,725 | B2 | 1/2019 | Sugumaran et al. |
| 10,172,282 | B2 | 1/2019 | Svensson et al. |
| 10,178,826 | B2 | 1/2019 | Jägenstedt et al. |
| 10,183,400 | B2 | 1/2019 | Trigui et al. |
| 10,183,701 | B2 | 1/2019 | Ebrahimi Afrouzi et al. |
| 10,185,325 | B2 | 1/2019 | Reigo et al. |
| 10,201,261 | B2 | 2/2019 | Tanaka et al. |
| 10,207,557 | B2 | 2/2019 | Björn et al. |
| 10,212,880 | B2 | 2/2019 | Cmich et al. |
| 10,238,026 | B2 | 3/2019 | Köhler et al. |
| D845,877 | S | 4/2019 | Geng et al. |
| 10,244,678 | B2 | 4/2019 | Lydon et al. |
| 10,246,907 | B2 | 4/2019 | Shen |
| 10,257,976 | B2 | 4/2019 | Ladd, Jr. et al. |
| 10,259,498 | B2 | 4/2019 | Jägenstedt et al. |
| 10,268,206 | B2 | 4/2019 | Yamamura |
| 10,274,954 | B2 | 4/2019 | Balutis et al. |
| D848,488 | S | 5/2019 | Cmich |
| 10,281,912 | B2 | 5/2019 | Hollister |
| 10,281,922 | B2 | 5/2019 | Smith et al. |
| 10,299,431 | B2 | 5/2019 | Ladd, Jr. et al. |
| 10,299,652 | B2 | 5/2019 | Gilbert, Jr. et al. |
| D852,232 | S | 6/2019 | Eidson et al. |
| 10,310,510 | B2 | 6/2019 | Mannefred et al. |
| 10,315,306 | B2 | 6/2019 | Abramson |
| 10,321,625 | B2 | 6/2019 | Einecke et al. |
| 10,327,384 | B2 | 6/2019 | Johansson et al. |
| D853,447 | S | 7/2019 | Mehra et al. |
| D853,448 | S | 7/2019 | Mehra et al. |
| D853,449 | S | 7/2019 | Mehra et al. |
| 10,338,602 | B2 | 7/2019 | Grufman et al. |
| 10,343,280 | B1 | 7/2019 | Ebrahimi Afrouzi |
| 10,346,995 | B1 | 7/2019 | Ebrahimi Afrouzi |
| 10,353,399 | B2 | 7/2019 | Ebrahimi Afrouzi |
| 10,362,730 | B2 | 7/2019 | Ladd, Jr. et al. |
| 10,365,661 | B2 | 7/2019 | Jägenstedt et al. |
| 10,369,705 | B2 | 8/2019 | Trigui et al. |
| 10,372,140 | B2 | 8/2019 | Sun et al. |
| 10,375,880 | B2 | 8/2019 | Morin et al. |
| 10,377,035 | B2 | 8/2019 | He et al. |
| 10,379,172 | B2 | 8/2019 | Kleiner et al. |
| 10,384,346 | B2 | 8/2019 | Hickman et al. |
| 10,386,844 | B2 | 8/2019 | Wilcox et al. |
| 10,390,483 | B2 | 8/2019 | Balutis et al. |
| D858,424 | S | 9/2019 | Chattopadhyay |
| 10,405,488 | B2 | 9/2019 | Kamfors et al. |
| 10,425,488 | B2 | 9/2019 | Larsén et al. |
| D864,256 | S | 10/2019 | Eidson et al. |
| 10,426,083 | B2 | 10/2019 | Doughty |
| 10,440,879 | B2 | 10/2019 | Björn et al. |
| 10,442,083 | B2 | 10/2019 | Wolowelsky et al. |
| 10,444,756 | B2 | 10/2019 | Kamfors et al. |
| 10,444,757 | B2 | 10/2019 | Dong et al. |
| 10,444,760 | B2 | 10/2019 | Grufman et al. |
| 10,448,565 | B2 | 10/2019 | Mannefred et al. |
| 10,454,287 | B2 | 10/2019 | Yamamura et al. |
| 10,456,924 | B2 | 10/2019 | Outa et al. |
| 10,459,452 | B2 | 10/2019 | Eagling et al. |
| 10,462,961 | B2 | 11/2019 | Tjernberg et al. |
| 10,463,215 | B2 | 11/2019 | Morin et al. |
| 10,464,206 | B2 | 11/2019 | Frisby et al. |
| 10,466,710 | B2 | 11/2019 | Biber et al. |
| 10,485,164 | B2 | 11/2019 | Letsky |
| 10,488,865 | B2 | 11/2019 | Afrouzi et al. |
| 10,496,262 | B1 | 12/2019 | Ebrahimi Afrouzi et al. |
| 10,500,722 | B2 | 12/2019 | Vicenti |
| 10,514,701 | B2 | 12/2019 | Windorfer |
| 10,517,211 | B2 | 12/2019 | Öhrlund et al. |
| 10,518,651 | B2 | 12/2019 | Svensson et al. |
| 10,520,113 | B1 | 12/2019 | Thompson |
| 10,542,667 | B2 | 1/2020 | Song et al. |
| 10,542,670 | B2 | 1/2020 | Cmich et al. |
| 10,549,646 | B2 | 2/2020 | Reynolds et al. |
| 10,551,844 | B2 | 2/2020 | Biber et al. |
| 10,552,770 | B2 | 2/2020 | Brough et al. |
| 10,555,456 | B2 | 2/2020 | Borinato |
| 10,555,457 | B2 | 2/2020 | Song et al. |
| 10,561,063 | B2 | 2/2020 | Hasegawa et al. |
| 10,568,258 | B2 | 2/2020 | Wahlgren |
| 10,571,905 | B2 | 2/2020 | Yamamura |
| 10,571,928 | B2 | 2/2020 | Sun et al. |
| 10,575,465 | B2 | 3/2020 | Ran et al. |

(56) References Cited

U.S. PATENT DOCUMENTS

| | | | |
|---|---|---|---|
| 10,575,696 | B2 | 3/2020 | O'Brien et al. |
| 10,583,562 | B2 | 3/2020 | Stout et al. |
| 10,588,255 | B2 | 3/2020 | Song et al. |
| 10,589,418 | B2 | 3/2020 | Gordon-Carroll et al. |
| 10,589,432 | B2 | 3/2020 | Al Nahwi et al. |
| 10,589,433 | B2 | 3/2020 | Al Nahwi et al. |
| 10,592,998 | B2 | 3/2020 | Eijdenberg et al. |
| 10,594,117 | B2 | 3/2020 | Song et al. |
| 10,595,459 | B2 | 3/2020 | Aposhian et al. |
| 10,595,692 | B2 | 3/2020 | Morin et al. |
| 10,598,793 | B2 | 3/2020 | Öhrlund et al. |
| 10,599,154 | B2 | 3/2020 | Dean et al. |
| 10,606,275 | B2 | 3/2020 | Dean et al. |
| 10,606,279 | B2 | 3/2020 | Grufman et al. |
| D880,532 | S | 4/2020 | Gunnarsson et al. |
| D881,252 | S | 4/2020 | Vestberg et al. |
| D882,640 | S | 4/2020 | Estey |
| 10,609,862 | B2 | 4/2020 | Wu et al. |
| 10,611,028 | B1 | 4/2020 | Zhou et al. |
| 10,612,929 | B2 | 4/2020 | Afrouzi et al. |
| 10,613,541 | B1 | 4/2020 | Ebrahimi Afrouzi et al. |
| 10,621,537 | B2 | 4/2020 | Ben-Alexander |
| D884,762 | S | 5/2020 | Gunnarsson et al. |
| D884,763 | S | 5/2020 | Gunnarsson et al. |
| 10,643,377 | B2 | 5/2020 | Grufman et al. |
| 10,646,997 | B2 | 5/2020 | Reigo et al. |
| 10,649,466 | B2 | 5/2020 | Holmström et al. |
| 10,651,594 | B1 | 5/2020 | Tsai et al. |
| 10,653,057 | B2 | 5/2020 | Choi et al. |
| 10,653,058 | B2 | 5/2020 | Yamanaka et al. |
| 10,653,282 | B2 | 5/2020 | Song et al. |
| 10,656,652 | B2 | 5/2020 | Dean et al. |
| D887,464 | S | 6/2020 | Gunnarsson et al. |
| D887,465 | S | 6/2020 | Gunnarsson et al. |
| D887,466 | S | 6/2020 | Gunnarsson et al. |
| 10,670,406 | B2 | 6/2020 | Eguchi et al. |
| 10,673,630 | B2 | 6/2020 | Pakkan et al. |
| 10,674,659 | B2 | 6/2020 | Ladd, Jr. et al. |
| 10,674,660 | B2 | 6/2020 | Matsuzawa et al. |
| 10,681,863 | B2 | 6/2020 | Hans et al. |
| 10,681,864 | B2 | 6/2020 | Matt et al. |
| 10,691,000 | B2 | 6/2020 | Du et al. |
| 10,698,417 | B2 | 6/2020 | Churavy et al. |
| D889,517 | S | 7/2020 | Prybor et al. |
| 10,716,258 | B2 | 7/2020 | Pellenc et al. |
| 10,721,860 | B2 | 7/2020 | Liljedahl |
| D892,187 | S | 8/2020 | Maggard |
| 10,737,369 | B2 | 8/2020 | Steinhauser et al. |
| 10,737,395 | B2 | 8/2020 | Wolff et al. |
| 10,738,495 | B2 | 8/2020 | Durvasula et al. |
| 10,739,769 | B2 | 8/2020 | Dean et al. |
| 10,747,413 | B2 | 8/2020 | Schneider et al. |
| 10,750,667 | B2 | 8/2020 | Yamauchi et al. |
| 10,750,918 | B2 | 8/2020 | Jung et al. |
| D896,737 | S | 9/2020 | Phely |
| 10,758,100 | B2 | 9/2020 | Cohen et al. |
| 10,765,284 | B2 | 9/2020 | Song et al. |
| 10,766,147 | B2 | 9/2020 | Trigui et al. |
| 10,777,000 | B2 | 9/2020 | Grufman et al. |
| 10,782,705 | B2 | 9/2020 | Reigo et al. |
| 10,785,907 | B2 | 9/2020 | Doughty et al. |
| 10,788,832 | B2 | 9/2020 | Nykamp |
| 10,791,684 | B2 | 10/2020 | He et al. |
| 10,795,377 | B2 | 10/2020 | Afrouzi et al. |
| 10,806,075 | B2 | 10/2020 | Grufman et al. |
| 10,809,071 | B2 | 10/2020 | Afrouzi et al. |
| 10,809,740 | B2 | 10/2020 | Reinert et al. |
| 10,814,495 | B2 | 10/2020 | Patel et al. |
| 10,820,493 | B2 | 11/2020 | Ritzer et al. |
| 10,824,163 | B2 | 11/2020 | Einecke et al. |
| 10,842,074 | B2 | 11/2020 | Jägenstedt et al. |
| 10,843,734 | B1 | 11/2020 | Ebrahimi Afrouzi et al. |
| 10,843,735 | B1 | 11/2020 | Ebrahimi Afrouzi et al. |
| 10,845,481 | B2 | 11/2020 | Pierce et al. |
| 10,845,804 | B2 | 11/2020 | Holgersson et al. |
| D906,373 | S | 12/2020 | Morin et al. |
| 10,849,267 | B2 | 12/2020 | Strandberg et al. |
| 10,849,270 | B2 | 12/2020 | Johansson et al. |
| 10,850,400 | B2 | 12/2020 | Park |
| 10,852,735 | B2 | 12/2020 | Tan et al. |
| 10,852,738 | B2 | 12/2020 | Mannefred et al. |
| 10,856,467 | B2 | 12/2020 | Maggard |
| 10,858,041 | B2 | 12/2020 | Jägenstedt et al. |
| 10,869,432 | B2 | 12/2020 | Wykman et al. |
| 10,873,194 | B2 | 12/2020 | Lydon et al. |
| 10,874,045 | B2 | 12/2020 | Balutis et al. |
| 10,874,049 | B2 | 12/2020 | Ladd, Jr. et al. |
| 10,874,051 | B2 | 12/2020 | Kasai et al. |
| 10,874,278 | B2 | 12/2020 | Matt et al. |
| D908,597 | S | 1/2021 | Meng et al. |
| D908,598 | S | 1/2021 | Meng et al. |
| 10,882,187 | B2 | 1/2021 | Li et al. |
| 10,888,046 | B2 | 1/2021 | Gorenflo et al. |
| 10,890,921 | B2 | 1/2021 | Gillett |
| 10,895,876 | B2 | 1/2021 | Arenz et al. |
| 10,899,171 | B2 | 1/2021 | Cmich |
| 10,912,253 | B2 | 2/2021 | Einecke et al. |
| 10,928,833 | B2 | 2/2021 | Reigo |
| 10,932,409 | B2 | 3/2021 | Ingvalson et al. |
| 10,935,383 | B1 | 3/2021 | Ebrahimi Afrouzi et al. |
| 10,939,611 | B2 | 3/2021 | Liljedahl |
| 10,952,578 | B2 | 3/2021 | Gill et al. |
| 10,959,371 | B2 | 3/2021 | Zhou et al. |
| 10,966,368 | B2 | 4/2021 | Desai et al. |
| 10,967,752 | B2 | 4/2021 | Liu et al. |
| 10,973,168 | B2 | 4/2021 | Hans et al. |
| 10,986,775 | B2 | 4/2021 | Matt et al. |
| 10,986,971 | B1 | 4/2021 | Ebrahimi Afrouzi |
| 10,993,598 | B2 | 5/2021 | Park et al. |
| 11,003,192 | B2 | 5/2021 | Dalfra et al. |
| 11,009,869 | B2 | 5/2021 | Moroi et al. |
| 11,013,655 | B1 | 5/2021 | Ebrahimi Afrouzi et al. |
| 11,014,460 | B2 | 5/2021 | Schnittman et al. |
| 11,016,481 | B2 | 5/2021 | Gustavsson et al. |
| D922,444 | S | 6/2021 | Morin et al. |
| 11,019,975 | B2 | 6/2021 | Jang et al. |
| 11,020,857 | B2 | 6/2021 | Xiong et al. |
| 11,039,582 | B2 | 6/2021 | Gilliam et al. |
| 11,039,583 | B2 | 6/2021 | Gilliam et al. |
| 11,044,844 | B2 | 6/2021 | Keski-luopa et al. |
| 11,048,268 | B2 | 6/2021 | Ouyang |
| 11,051,449 | B2 | 7/2021 | Bergh et al. |
| 11,051,671 | B2 | 7/2021 | Jang et al. |
| 11,052,535 | B2 | 7/2021 | Parks et al. |
| 11,052,540 | B2 | 7/2021 | Stout et al. |
| 11,054,822 | B2 | 7/2021 | Özmen |
| 11,054,836 | B2 | 7/2021 | Wang et al. |
| 11,058,053 | B2 | 7/2021 | Patel et al. |
| 11,064,652 | B2 | 7/2021 | Matt et al. |
| 11,065,762 | B2 | 7/2021 | Sakai et al. |
| 11,069,082 | B1 | 7/2021 | Ebrahimi Afrouzi et al. |
| 11,071,429 | B2 | 7/2021 | Jang et al. |
| 11,072,250 | B2 | 7/2021 | Gilbert, Jr. et al. |
| 11,072,255 | B2 | 7/2021 | Svensson et al. |
| 11,075,910 | B2 | 7/2021 | Dean et al. |
| 11,076,529 | B2 | 8/2021 | Chen et al. |
| 11,079,755 | B2 | 8/2021 | Schlacks, IV et al. |
| 11,084,172 | B2 | 8/2021 | Casey et al. |
| 11,089,732 | B2 | 8/2021 | Jägenstedt et al. |
| 11,097,428 | B2 | 8/2021 | Al Nahwi et al. |
| 11,099,572 | B2 | 8/2021 | Cestonaro et al. |
| 11,104,006 | B2 | 8/2021 | Fay et al. |
| 11,105,109 | B2 | 8/2021 | Durvasula et al. |
| 11,106,215 | B2 | 8/2021 | Dalfra |
| 11,109,528 | B2 | 9/2021 | Strang |
| 11,109,731 | B2 | 9/2021 | Jang et al. |
| 11,112,505 | B2 | 9/2021 | Öhrlund et al. |
| 11,112,532 | B2 | 9/2021 | Jägenstedt et al. |
| 11,115,798 | B2 | 9/2021 | Beaulieu et al. |
| 11,117,264 | B2 | 9/2021 | Tsai et al. |
| 11,119,496 | B1 | 9/2021 | Ebrahimi Afrouzi et al. |
| 11,126,193 | B2 | 9/2021 | Mannefred et al. |
| 11,134,609 | B2 | 10/2021 | Willgert et al. |
| 11,140,815 | B2 | 10/2021 | Matt et al. |

(56) References Cited

U.S. PATENT DOCUMENTS

| | | |
|---|---|---|
| 11,140,819 B2 | 10/2021 | Chen et al. |
| 11,141,034 B2 | 10/2021 | Jang et al. |
| 11,154,006 B2 | 10/2021 | Liljedahl |
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0277127 A1* | 11/2008 | Dixon ............... A01D 34/733 |
| | | 172/552 |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0223193 A1* | 9/2009 | Funnell ............... A01D 34/73 |
| | | 56/17.5 |
| 2009/0229235 A1* | 9/2009 | Lindmeyer .......... A01D 34/733 |
| | | 83/651 |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |

(56) References Cited

U.S. PATENT DOCUMENTS

| 2016/0014957 A1 | 1/2016 | Johansson et al. |
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |

(56) References Cited

U.S. PATENT DOCUMENTS

| | | |
|---|---|---|
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| AU | 2011239328 A1 | 11/2011 |
|---|---|---|
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |

(56) References Cited

FOREIGN PATENT DOCUMENTS

| | | | |
|---|---|---|---|
| CN | 2693167 | Y | 4/2005 |
| CN | 3512456 | | 3/2006 |
| CN | 3599999 | | 1/2007 |
| CN | 3626101 | | 3/2007 |
| CN | 101185088 | A | 5/2008 |
| CN | 300775531 | | 5/2008 |
| CN | 201127182 | Y | 10/2008 |
| CN | 101313319 | A | 11/2008 |
| CN | 201226676 | Y | 4/2009 |
| CN | 201226677 | Y | 4/2009 |
| CN | 100485567 | C | 5/2009 |
| CN | 100498602 | C | 6/2009 |
| CN | 201260303 | Y | 6/2009 |
| CN | 301144405 | | 2/2010 |
| CN | 301276003 | | 6/2010 |
| CN | 301290512 | | 7/2010 |
| CN | 201557392 | U | 8/2010 |
| CN | 301328063 | | 8/2010 |
| CN | 101292244 | B | 12/2010 |
| CN | 301444971 | | 1/2011 |
| CN | 101982037 | A | 3/2011 |
| CN | 201797741 | U | 4/2011 |
| CN | 301506267 | | 4/2011 |
| CN | 201846616 | U | 6/2011 |
| CN | 301573109 | | 6/2011 |
| CN | 301611305 | | 7/2011 |
| CN | 301653707 | | 8/2011 |
| CN | 301660006 | | 8/2011 |
| CN | 301742022 | | 11/2011 |
| CN | 202077380 | U | 12/2011 |
| CN | 102523841 | A | 7/2012 |
| CN | 302020661 | | 8/2012 |
| CN | 102687620 | A | 9/2012 |
| CN | 102687625 | A | 9/2012 |
| CN | 302080704 | | 9/2012 |
| CN | 102771246 | A | 11/2012 |
| CN | 102771259 | A | 11/2012 |
| CN | 302218376 | | 12/2012 |
| CN | 102880175 | A | 1/2013 |
| CN | 302299693 | | 1/2013 |
| CN | 302350176 | | 3/2013 |
| CN | 302456271 | | 6/2013 |
| CN | 302483861 | | 6/2013 |
| CN | 103294056 | A | 9/2013 |
| CN | 103324191 | A | 9/2013 |
| CN | 103324192 | A | 9/2013 |
| CN | 203233683 | U | 10/2013 |
| CN | 302629702 | | 11/2013 |
| CN | 103473497 | A | 12/2013 |
| CN | 302702748 | | 1/2014 |
| CN | 103563544 | A | 2/2014 |
| CN | 103578164 | A | 2/2014 |
| CN | 103676947 | A | 3/2014 |
| CN | 203575087 | U | 5/2014 |
| CN | 103858584 | A | 6/2014 |
| CN | 203691948 | U | 7/2014 |
| CN | 203735069 | U | 7/2014 |
| CN | 302881351 | | 7/2014 |
| CN | 104007765 | A | 8/2014 |
| CN | 104025796 | A | 9/2014 |
| CN | 203840762 | U | 9/2014 |
| CN | 302943247 | | 9/2014 |
| CN | 302943249 | | 9/2014 |
| CN | 104094727 | A | 10/2014 |
| CN | 104111460 | A | 10/2014 |
| CN | 104111651 | A | 10/2014 |
| CN | 104111652 | A | 10/2014 |
| CN | 104111653 | A | 10/2014 |
| CN | 104115612 | A | 10/2014 |
| CN | 203851480 | U | 10/2014 |
| CN | 302974154 | | 10/2014 |
| CN | 104160830 | A | 11/2014 |
| CN | 302993652 | | 11/2014 |
| CN | 204014494 | U | 12/2014 |
| CN | 204047176 | U | 12/2014 |
| CN | 303058887 | | 12/2014 |
| CN | 303075143 | | 1/2015 |
| CN | 104360684 | A | 2/2015 |
| CN | 204143255 | U | 2/2015 |
| CN | 104571102 | A | 4/2015 |
| CN | 104686050 | A | 6/2015 |
| CN | 104704979 | A | 6/2015 |
| CN | 104704980 | A | 6/2015 |
| CN | 204362599 | U | 6/2015 |
| CN | 303232131 | | 6/2015 |
| CN | 104737699 | A | 7/2015 |
| CN | 104750104 | A | 7/2015 |
| CN | 104782314 | A | 7/2015 |
| CN | 104793614 | A | 7/2015 |
| CN | 104793617 | A | 7/2015 |
| CN | 204443108 | U | 7/2015 |
| CN | 204462853 | U | 7/2015 |
| CN | 204495362 | U | 7/2015 |
| CN | 204515530 | U | 7/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205489586 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |

(56)        References Cited

FOREIGN PATENT DOCUMENTS

| | | | |
|---|---|---|---|
| CN | 304055132 | | 2/2017 |
| CN | 304055134 | | 2/2017 |
| CN | 304055136 | | 2/2017 |
| CN | 106489412 | A | 3/2017 |
| CN | 205993268 | U | 3/2017 |
| CN | 103576681 | B | 4/2017 |
| CN | 206115269 | U | 4/2017 |
| CN | 304095129 | | 4/2017 |
| CN | 106647727 | A | 5/2017 |
| CN | 106708033 | A | 5/2017 |
| CN | 206196372 | U | 5/2017 |
| CN | 304129527 | | 5/2017 |
| CN | 304129534 | | 5/2017 |
| CN | 106852225 | A | 6/2017 |
| CN | 106877420 | A | 6/2017 |
| CN | 206274765 | U | 6/2017 |
| CN | 206278169 | U | 6/2017 |
| CN | 304175254 | | 6/2017 |
| CN | 304208974 | | 7/2017 |
| CN | 107024910 | A | 8/2017 |
| CN | 304227934 | | 8/2017 |
| CN | 304241160 | | 8/2017 |
| CN | 206472500 | U | 9/2017 |
| CN | 304283754 | | 9/2017 |
| CN | 206547328 | U | 10/2017 |
| CN | 206547363 | U | 10/2017 |
| CN | 206611777 | U | 11/2017 |
| CN | 206611791 | U | 11/2017 |
| CN | 206611812 | U | 11/2017 |
| CN | 206619022 | U | 11/2017 |
| CN | 107463166 | A | 12/2017 |
| CN | 107463168 | A | 12/2017 |
| CN | 107505939 | A | 12/2017 |
| CN | 107515603 | A | 12/2017 |
| CN | 107516226 | A | 12/2017 |
| CN | 107517642 | A | 12/2017 |
| CN | 206686605 | U | 12/2017 |
| CN | 206808075 | U | 12/2017 |
| CN | 107544483 | A | 1/2018 |
| CN | 107600209 | A | 1/2018 |
| CN | 107624368 | A | 1/2018 |
| CN | 207037461 | U | 2/2018 |
| CN | 107800200 | A | 3/2018 |
| CN | 207075257 | U | 3/2018 |
| CN | 304529661 | | 3/2018 |
| CN | 304544247 | | 3/2018 |
| CN | 107888751 | A | 4/2018 |
| CN | 107913034 | A | 4/2018 |
| CN | 107960191 | A | 4/2018 |
| CN | 207201326 | U | 4/2018 |
| CN | 304565875 | | 4/2018 |
| CN | 108055906 | A | 5/2018 |
| CN | 108064539 | A | 5/2018 |
| CN | 108073179 | A | 5/2018 |
| CN | 207284228 | U * | 5/2018 |
| CN | 108156957 | A | 6/2018 |
| CN | 108205313 | A | 6/2018 |
| CN | 207496811 | U | 6/2018 |
| CN | 108323326 | A | 7/2018 |
| CN | 108337987 | A | 7/2018 |
| CN | 108345297 | A | 7/2018 |
| CN | 108345298 | A | 7/2018 |
| CN | 207639110 | U | 7/2018 |
| CN | 207651536 | U | 7/2018 |
| CN | 207692389 | U | 8/2018 |
| CN | 304767946 | | 8/2018 |
| CN | 304794944 | | 8/2018 |
| CN | 207851614 | U | 9/2018 |
| CN | 304806495 | | 9/2018 |
| CN | 304811825 | | 9/2018 |
| CN | 108664014 | A | 10/2018 |
| CN | 108693873 | A | 10/2018 |
| CN | 207965652 | U | 10/2018 |
| CN | 108919814 | A | 11/2018 |
| CN | 208159284 | U | 11/2018 |
| CN | 108957512 | A | 12/2018 |
| CN | 109062225 | A | 12/2018 |
| CN | 109075284 | A | 12/2018 |
| CN | 208175354 | U | 12/2018 |
| CN | 208285831 | U | 12/2018 |
| CN | 304926953 | | 12/2018 |
| CN | 304926955 | | 12/2018 |
| CN | 109213123 | A | 1/2019 |
| CN | 208387297 | U | 1/2019 |
| CN | 304980236 | | 1/2019 |
| CN | 305010344 | | 1/2019 |
| CN | 305010365 | | 1/2019 |
| CN | 305017366 | | 1/2019 |
| CN | 105875063 | B | 2/2019 |
| CN | 208480301 | U | 2/2019 |
| CN | 208521989 | U | 2/2019 |
| CN | 305027640 | | 2/2019 |
| CN | 109542092 | A | 3/2019 |
| CN | 208638993 | U | 3/2019 |
| CN | 109566065 | A | 4/2019 |
| CN | 109601114 | A | 4/2019 |
| CN | 109658937 | A | 4/2019 |
| CN | 109682368 | A | 4/2019 |
| CN | 109682371 | A | 4/2019 |
| CN | 109683604 | A | 4/2019 |
| CN | 109696888 | A | 4/2019 |
| CN | 208739598 | U | 4/2019 |
| CN | 208752461 | U | 4/2019 |
| CN | 109757189 | A | 5/2019 |
| CN | 106982585 | B | 6/2019 |
| CN | 109892096 | A | 6/2019 |
| CN | 209002355 | U | 6/2019 |
| CN | 209002393 | U | 6/2019 |
| CN | 305196413 | | 6/2019 |
| CN | 305225230 | | 6/2019 |
| CN | 305227797 | | 6/2019 |
| CN | 305227798 | | 6/2019 |
| CN | 305227800 | | 6/2019 |
| CN | 305503785 | | 6/2019 |
| CN | 109960253 | A | 7/2019 |
| CN | 109962512 | A | 7/2019 |
| CN | 109983907 | A | 7/2019 |
| CN | 109983908 | A | 7/2019 |
| CN | 110018686 | A | 7/2019 |
| CN | 209170907 | U | 7/2019 |
| CN | 305261165 | | 7/2019 |
| CN | 305261166 | | 7/2019 |
| CN | 305265564 | | 7/2019 |
| CN | 209265268 | U | 8/2019 |
| CN | 209299766 | U | 8/2019 |
| CN | 106155056 | B | 9/2019 |
| CN | 110221594 | A | 9/2019 |
| CN | 110268858 | A | 9/2019 |
| CN | 209409782 | U | 9/2019 |
| CN | 305355791 | | 9/2019 |
| CN | 305357008 | | 9/2019 |
| CN | 110347144 | A | 10/2019 |
| CN | 110366368 | A | 10/2019 |
| CN | 305407445 | | 10/2019 |
| CN | 110447372 | A | 11/2019 |
| CN | 209676901 | U | 11/2019 |
| CN | 305447400 | | 11/2019 |
| CN | 305452583 | | 11/2019 |
| CN | 110584551 | A | 12/2019 |
| CN | 110622680 | A | 12/2019 |
| CN | 209861609 | U | 12/2019 |
| CN | 305523640 | | 12/2019 |
| CN | 209955654 | U | 1/2020 |
| CN | 209964645 | U | 1/2020 |
| CN | 305574602 | | 1/2020 |
| CN | 110764495 | A | 2/2020 |
| CN | 110850858 | A | 2/2020 |
| CN | 110850860 | A | 2/2020 |
| CN | 110852133 | A | 2/2020 |
| CN | 210016305 | U | 2/2020 |
| CN | 210116329 | U | 2/2020 |
| CN | 305596393 | | 2/2020 |
| CN | 105988472 | B | 3/2020 |
| CN | 107493797 | B | 3/2020 |

(56)　　　　References Cited

FOREIGN PATENT DOCUMENTS

| CN | 110881903 | A | 3/2020 |
| CN | 110895411 | A | 3/2020 |
| CN | 110915409 | A | 3/2020 |
| CN | 110928280 | A | 3/2020 |
| CN | 110928285 | A | 3/2020 |
| CN | 107643751 | B | 4/2020 |
| CN | 111034450 | A | 4/2020 |
| CN | 111045423 | A | 4/2020 |
| CN | 305716236 | | 4/2020 |
| CN | 107643750 | B | 5/2020 |
| CN | 108142070 | B | 5/2020 |
| CN | 111123910 | A | 5/2020 |
| CN | 111165158 | A | 5/2020 |
| CN | 210444878 | U | 5/2020 |
| CN | 210580043 | U | 5/2020 |
| CN | 305750432 | | 5/2020 |
| CN | 305757781 | | 5/2020 |
| CN | 305789888 | | 5/2020 |
| CN | 111226569 | A | 6/2020 |
| CN | 210782124 | U | 6/2020 |
| CN | 210808273 | U | 6/2020 |
| CN | 210821640 | U | 6/2020 |
| CN | 210839520 | U | 6/2020 |
| CN | 305827495 | | 6/2020 |
| CN | 305827496 | | 6/2020 |
| CN | 305827503 | | 6/2020 |
| CN | 305860595 | | 6/2020 |
| CN | 305860598 | | 6/2020 |
| CN | 305869411 | | 6/2020 |
| CN | 106717462 | B | 7/2020 |
| CN | 108811699 | B | 7/2020 |
| CN | 210900401 | U | 7/2020 |
| CN | 210987056 | U | 7/2020 |
| CN | 211015146 | U | 7/2020 |
| CN | 305946746 | | 7/2020 |
| CN | 305946760 | | 7/2020 |
| CN | 111487982 | A | 8/2020 |
| CN | 111512766 | A | 8/2020 |
| CN | 211212948 | U | 8/2020 |
| CN | 305989577 | | 8/2020 |
| CN | 306019404 | | 8/2020 |
| CN | 105988471 | B | 9/2020 |
| CN | 111685651 | A | 9/2020 |
| CN | 211531846 | U | 9/2020 |
| CN | 211580673 | U | 9/2020 |
| CN | 107637255 | B | 10/2020 |
| CN | 110754204 | B | 10/2020 |
| CN | 111742692 | A | 10/2020 |
| CN | 111766589 | A | 10/2020 |
| CN | 111819988 | A | 10/2020 |
| CN | 211721118 | U | 10/2020 |
| CN | 211721119 | U | 10/2020 |
| CN | 211741921 | U | 10/2020 |
| CN | 211741924 | U | 10/2020 |
| CN | 306085189 | | 10/2020 |
| CN | 306128197 | | 10/2020 |
| CN | 306140210 | | 10/2020 |
| CN | 306174630 | | 11/2020 |
| CN | 112009175 | A | 12/2020 |
| CN | 112119742 | A | 12/2020 |
| CN | 112120620 | A | 12/2020 |
| CN | 112134314 | A | 12/2020 |
| CN | 112147992 | A | 12/2020 |
| CN | 212061111 | U | 12/2020 |
| CN | 212116218 | U | 12/2020 |
| CN | 212116223 | U | 12/2020 |
| CN | 306223128 | | 12/2020 |
| CN | 306236075 | | 12/2020 |
| CN | 306236808 | | 12/2020 |
| CN | 112230636 | A | 1/2021 |
| CN | 112230637 | A | 1/2021 |
| CN | 112230644 | A | 1/2021 |
| CN | 112235760 | A | 1/2021 |
| CN | 112259866 | A | 1/2021 |
| CN | 112261631 | A | 1/2021 |
| CN | 212304892 | U | 1/2021 |
| CN | 212305863 | U | 1/2021 |
| CN | 306278588 | | 1/2021 |
| CN | 306303188 | | 1/2021 |
| CN | 106909140 | B | 2/2021 |
| CN | 109247117 | B | 2/2021 |
| CN | 109683556 | B | 2/2021 |
| CN | 112306049 | A | 2/2021 |
| CN | 112385401 | A | 2/2021 |
| CN | 112400453 | A | 2/2021 |
| CN | 212499740 | U | 2/2021 |
| CN | 212515710 | U | 2/2021 |
| CN | 212520009 | U | 2/2021 |
| CN | 212539202 | U | 2/2021 |
| CN | 212572469 | U | 2/2021 |
| CN | 212621511 | U | 2/2021 |
| CN | 306328112 | | 2/2021 |
| CN | 112435422 | A | 3/2021 |
| CN | 112438114 | A | 3/2021 |
| CN | 112445221 | A | 3/2021 |
| CN | 112449864 | A | 3/2021 |
| CN | 112492956 | A | 3/2021 |
| CN | 112514637 | A | 3/2021 |
| CN | 112567959 | A | 3/2021 |
| CN | 112567961 | A | 3/2021 |
| CN | 212696648 | U | 3/2021 |
| CN | 212696668 | U | 3/2021 |
| CN | 306358736 | | 3/2021 |
| CN | 112602441 | A | 4/2021 |
| CN | 112720451 | A | 4/2021 |
| CN | 112731935 | A | 4/2021 |
| CN | 212876733 | U | 4/2021 |
| CN | 212906002 | U | 4/2021 |
| CN | 212933333 | U | 4/2021 |
| CN | 212970834 | U | 4/2021 |
| CN | 213075541 | U | 4/2021 |
| CN | 213091901 | U | 4/2021 |
| CN | 112740889 | A | 5/2021 |
| CN | 112764419 | A | 5/2021 |
| CN | 112769424 | A | 5/2021 |
| CN | 112773264 | A | 5/2021 |
| CN | 112799395 | A | 5/2021 |
| CN | 112799399 | A | 5/2021 |
| CN | 112823584 | A | 5/2021 |
| CN | 112824993 | A | 5/2021 |
| CN | 112826376 | A | 5/2021 |
| CN | 112840828 | A | 5/2021 |
| CN | 112859828 | A | 5/2021 |
| CN | 213187216 | U | 5/2021 |
| CN | 213210764 | U | 5/2021 |
| CN | 213214364 | U | 5/2021 |
| CN | 213240579 | U | 5/2021 |
| CN | 306511371 | | 5/2021 |
| CN | 306530808 | | 5/2021 |
| CN | 306569554 | | 5/2021 |
| CN | 306569555 | | 5/2021 |
| CN | 306569560 | | 5/2021 |
| CN | 107976995 | B | 6/2021 |
| CN | 110122045 | B | 6/2021 |
| CN | 112947399 | A | 6/2021 |
| CN | 112970414 | A | 6/2021 |
| CN | 113039919 | A | 6/2021 |
| CN | 213306269 | U | 6/2021 |
| CN | 306604261 | | 6/2021 |
| CN | 113064419 | A | 7/2021 |
| CN | 113156928 | A | 7/2021 |
| CN | 113156929 | A | 7/2021 |
| CN | 213814000 | U | 7/2021 |
| CN | 306670241 | | 7/2021 |
| CN | 306680105 | | 7/2021 |
| CN | 306694791 | | 7/2021 |
| CN | 106300578 | B | 8/2021 |
| CN | 108781704 | B | 8/2021 |
| CN | 113311830 | A | 8/2021 |
| CN | 213850492 | U | 8/2021 |
| CN | 213921292 | U | 8/2021 |
| CN | 306745285 | | 8/2021 |
| CN | 306753239 | | 8/2021 |
| CN | 306768440 | | 8/2021 |

(56) References Cited

FOREIGN PATENT DOCUMENTS

| | | |
|---|---|---|
| CN | 113366964 A | 9/2021 |
| CN | 113439526 A | 9/2021 |
| CN | 113448259 A | 9/2021 |
| CN | 214126036 U | 9/2021 |
| CN | 214151499 U | 9/2021 |
| CN | 214178073 U | 9/2021 |
| CN | 214240309 U | 9/2021 |
| CN | 306824139 | 9/2021 |
| CN | 306839148 | 9/2021 |
| CN | 306846782 | 9/2021 |
| CN | 113455167 A | 10/2021 |
| CN | 113552873 A | 10/2021 |
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2923551 A1 | 9/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |

(56) References Cited

FOREIGN PATENT DOCUMENTS

| | | | |
|---|---|---|---|
| EP | 3597090 | A1 | 1/2020 |
| EP | 3660618 | A1 | 6/2020 |
| EP | 3725146 | A1 | 10/2020 |
| EP | 3753387 | A1 | 12/2020 |
| EP | 3791708 | A1 | 3/2021 |
| EP | 3831544 | A1 | 6/2021 |
| EP | 3837944 | A1 | 6/2021 |
| EP | 3837945 | A1 | 6/2021 |
| EP | 3837946 | A1 | 6/2021 |
| EP | 3861911 | A2 | 8/2021 |
| ES | 199267 | U | 7/1975 |
| ES | 451339 | A1 | 12/1977 |
| FR | 2771141 | A1 | 5/1999 |
| FR | 3114537 | A1 | 4/2022 |
| GB | 1288108 | A | 3/1971 |
| GB | 1371959 | A | 10/1974 |
| GB | 1451896 | A | 10/1976 |
| GB | 1452308 | A | 10/1976 |
| GB | 1489373 | A | 10/1977 |
| GB | 1526519 | A | 9/1978 |
| GB | 1557379 | A | 12/1979 |
| GB | 2287170 | A | 9/1995 |
| GB | 2295304 | A | 5/1996 |
| GB | 2305840 | A | 4/1997 |
| GB | 2419430 | A | 4/2006 |
| GB | 2432922 | A | 6/2007 |
| GB | 2433791 | A | 7/2007 |
| GB | 90017056580001 | | 5/2010 |
| GB | 2500168 | A | 9/2013 |
| GB | 90024715400001 | | 8/2014 |
| GB | 2513960 | A | 11/2014 |
| GB | 2515556 | A | 12/2014 |
| GB | 2516370 | A | 1/2015 |
| GB | 90027012680001 | | 5/2015 |
| GB | 90027378900001 | | 10/2015 |
| GB | 90041329260001 | | 9/2017 |
| GB | 90029638920001 | | 3/2018 |
| GB | 90056318840001 | | 9/2018 |
| GB | 2563347 | A | 12/2018 |
| GB | 90040756950001 | | 6/2019 |
| GB | 90073918420006 | | 1/2020 |
| GB | 90080413210001 | | 8/2020 |
| GB | 2581956 | A | 9/2020 |
| GB | 90081876860001 | | 10/2020 |
| GB | 6195686 | | 5/2022 |
| JP | 2006251883 | A | 9/2006 |
| JP | 2006268497 | A | 10/2006 |
| JP | 2011020615 | A | 2/2011 |
| JP | 2015149963 | A | 8/2015 |
| KR | 20130044130 | A | 5/2013 |
| KR | 20150125305 | A | 11/2015 |
| SE | 538774 | C2 | 11/2016 |
| SE | 540834 | C2 | 11/2018 |
| SE | 542098 | C2 | 2/2020 |
| SE | 543019 | C2 | 9/2020 |
| SE | 543247 | C2 | 10/2020 |
| SE | 2150377 | A1 | 3/2021 |
| SE | 1951390 | A1 | 6/2021 |
| SE | 2150080 | A1 | 6/2021 |
| SE | 2050216 | A1 | 8/2021 |
| SE | 543941 | C2 | 9/2021 |
| SE | 543943 | C2 | 9/2021 |
| SE | 2150193 | A1 | 10/2021 |
| SE | 2150394 | A1 | 10/2021 |
| WO | WO9106435 | A1 | 5/1991 |
| WO | WO9749528 | A1 | 12/1997 |
| WO | WO0060921 | A1 | 10/2000 |
| WO | WO0074466 | A1 | 12/2000 |
| WO | WO03040846 | A1 | 5/2003 |
| WO | WO03103375 | A1 | 12/2003 |
| WO | WO2005002320 | A1 | 1/2005 |
| WO | WO2006094887 | A2 | 9/2006 |
| WO | WO2006094889 | A1 | 9/2006 |
| WO | WO2006102740 | A1 | 10/2006 |
| WO | WO2007091967 | A1 | 8/2007 |
| WO | WO2007140930 | A1 | 12/2007 |
| WO | WO2008015479 | A2 | 2/2008 |
| WO | WO2008060689 | A2 | 5/2008 |
| WO | WO2008068494 | A1 | 6/2008 |
| WO | WO2008095715 | A2 | 8/2008 |
| WO | WO2008144135 | A1 | 11/2008 |
| WO | WO2009036644 | A1 | 3/2009 |
| WO | WO2009071379 | A1 | 6/2009 |
| WO | WO2009077239 | A1 | 6/2009 |
| WO | WO2009083319 | A1 | 7/2009 |
| WO | WO2010077198 | A1 | 7/2010 |
| WO | WO2010130479 | A2 | 11/2010 |
| WO | WO2011115536 | A1 | 9/2011 |
| WO | WO2012047176 | A1 | 4/2012 |
| WO | WO2013010475 | A1 | 1/2013 |
| WO | WO2013011252 | A1 | 1/2013 |
| WO | WO2013025135 | A1 | 2/2013 |
| WO | WO2013064301 | A1 | 5/2013 |
| WO | WO2013081516 | A1 | 6/2013 |
| WO | WO2013083311 | A1 | 6/2013 |
| WO | WO2013102417 | A1 | 7/2013 |
| WO | WO2013107266 | A1 | 7/2013 |
| WO | WO2013107374 | A1 | 7/2013 |
| WO | WO2013125992 | A1 | 8/2013 |
| WO | WO2013185622 | A1 | 12/2013 |
| WO | WO2014007694 | A1 | 1/2014 |
| WO | WO2014056443 | A1 | 4/2014 |
| WO | WO2014071860 | A1 | 5/2014 |
| WO | WO2014079363 | A1 | 5/2014 |
| WO | WO2014079632 | A1 | 5/2014 |
| WO | WO2014086267 | A1 | 6/2014 |
| WO | WO2014173290 | A1 | 10/2014 |
| WO | WO2015010277 | A1 | 1/2015 |
| WO | WO2015053488 | A1 | 4/2015 |
| WO | WO2015144998 | A1 | 10/2015 |
| WO | WO2015154822 | A1 | 10/2015 |
| WO | WO2015161829 | A1 | 10/2015 |
| WO | WO2015169343 | A1 | 11/2015 |
| WO | WO2015172831 | A1 | 11/2015 |
| WO | WO2015182514 | A1 | 12/2015 |
| WO | WO2015192903 | A1 | 12/2015 |
| WO | WO2016038512 | A1 | 3/2016 |
| WO | WO2016097891 | A1 | 6/2016 |
| WO | WO2016097892 | A1 | 6/2016 |
| WO | WO2016097897 | A1 | 6/2016 |
| WO | WO2016103070 | A1 | 6/2016 |
| WO | WO2016108104 | A1 | 7/2016 |
| WO | WO2016109721 | A1 | 7/2016 |
| WO | WO2016119751 | A1 | 8/2016 |
| WO | WO2016127923 | A1 | 8/2016 |
| WO | WO2016131399 | A1 | 8/2016 |
| WO | WO2016184398 | A1 | 11/2016 |
| WO | WO-2017063539 | A1 * | 4/2017 | ........... A01D 34/828 |
| WO | WO2017101882 | A1 | 6/2017 |
| WO | WO2017123137 | A1 | 7/2017 |
| WO | WO2017129551 | A1 | 8/2017 |
| WO | WO2017133625 | A1 | 8/2017 |
| WO | WO2017148438 | A1 | 9/2017 |
| WO | WO2017167207 | A1 | 10/2017 |
| WO | WO2017181995 | A1 | 10/2017 |
| WO | WO2017186372 | A1 | 11/2017 |
| WO | WO2017190784 | A1 | 11/2017 |
| WO | WO2017198222 | A1 | 11/2017 |
| WO | WO2017206950 | A1 | 12/2017 |
| WO | WO2017211308 | A1 | 12/2017 |
| WO | WO2018001340 | A1 | 1/2018 |
| WO | WO2018010650 | A1 | 1/2018 |
| WO | WO2018028624 | A1 | 2/2018 |
| WO | WO2018057250 | A1 | 3/2018 |
| WO | WO2018057452 | A2 | 3/2018 |
| WO | WO2018057589 | A1 | 3/2018 |
| WO | WO2018059323 | A1 | 4/2018 |
| WO | WO2018103178 | A1 | 6/2018 |
| WO | WO2018117190 | A1 | 6/2018 |
| WO | WO2018125222 | A1 | 7/2018 |
| WO | WO2018127209 | A1 | 7/2018 |
| WO | WO2018146518 | A1 | 8/2018 |
| WO | WO2018153599 | A1 | 8/2018 |
| WO | WO2018174777 | A1 | 9/2018 |

(56)        References Cited

FOREIGN PATENT DOCUMENTS

| | | |
|---|---|---|
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO-2020192173 A1 * | 10/2020 .......... A01D 34/685 |
| WO | WO2020193513 A1 | 10/2020 |
| WO | WO2020199055 A1 | 10/2020 |
| WO | WO2020218960 A1 | 10/2020 |
| WO | WO2020256619 A1 | 12/2020 |
| WO | WO2020259586 A1 | 12/2020 |
| WO | WODM212022 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | WO2021164738 A1 | 8/2021 |
| WO | WO2021175331 A1 | 9/2021 |
| WO | WO2021180123 A1 | 9/2021 |
| WO | WO2021190627 A1 | 9/2021 |
| WO | WO2021208308 A1 | 10/2021 |
| WO | WO2021215980 A1 | 10/2021 |
| WO | WODM217452 | 10/2021 |
| WO | WO2021225494 A1 | 11/2021 |
| WO | WO2021230791 A1 | 11/2021 |
| WO | WO2021233205 A1 | 11/2021 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Translation of Document CN 207284228 U as retrieved on Aug. 13, 2025 (Year: 2018).*
Translation of Document WO 2017063539 A1 as retrieved on Aug. 13, 2025 (Year: 2017).*
Translation of Document WO 2020192173 A1 as retrieved on Aug. 13, 2025 (Year: 2020).*
Extended European Search Report for Application No. 23157984.8 dated Aug. 1, 2023 (9 pages).
Chinese Patent Office Action for Application No. 202310139425.X dated Apr. 16, 2026 (27 pages including machine English translation).

* cited by examiner

GARDEN TOOL WITH BLADE COVER

CROSS-REFERENCE TO RELATED APPLICATIONS

This application claims priority to U.S. Provisional Patent Application No. 63/312,724, filed Feb. 22, 2022, the entire contents of which are incorporated herein by reference.

FIELD OF THE INVENTION

The embodiments described herein related to a garden tool having a rotating blade assembly, and more specifically to a garden tool having a rotating blade assembly with a blade cover associated therewith.

BACKGROUND OF THE INVENTION

Robotic garden tools like robotic mowers may include a rotating blade assembly.

SUMMARY

In one aspect, a rotational cutting blade assembly for use with a garden tool. The rotational cutting blade assembly including a frame defining an axis of rotation and including a blade mounting point, where the blade mounting point includes a cutting boundary, and where the cutting boundary is subdivided into at least one access slot and at least one guard. The rotational cutting blade assembly also including a cutting element configured to be attached to the frame at the blade mounting point, where the cutting element includes at least one cutting edge, and where the at least one cutting edge is immediately adjacent the cutting boundary of the blade mounting point when the cutting element is attached thereto.

Alternatively or additionally, in any combination, the rotational cutting blade assembly may include a hub defining the axis of rotation, and at least one arm extending radially outwardly from the hub relative to the axis of rotation.

Alternatively or additionally, in any combination, the rotational cutting blade assembly may include where the blade mounting point is located in the at least one arm.

Alternatively or additionally, in any combination, the rotational cutting blade assembly may include where the arm includes a leading edge and a trailing edge relative to the direction of rotation, and where the at least one access slot is formed into the leading edge of the arm.

Alternatively or additionally, in any combination, the rotational cutting blade assembly may include, where the frame is substantially planar relative to the axis of rotation.

Alternatively or additionally, in any combination, the rotational cutting blade assembly may include where each of the at least one access slots are no greater than 12 mm wide.

Alternatively or additionally, in any combination, the rotational cutting blade assembly may include where the blade mounting point includes two cutting boundaries, and where each cutting boundary is subdivided into at least one access slot and at least one guard.

Alternatively or additionally, in any combination, the rotational cutting blade assembly may include where the blade mounting point includes a pocket formed into the frame, and where the cutting element is sized and shaped to be at least partially positioned within the pocket.

Alternatively or additionally, in any combination, the rotational cutting blade assembly may include where the pocket defines a first pocket depth, and where the first pocket depth corresponds to the thickness of the cutting element.

Alternatively or additionally, in any combination, the rotational cutting blade assembly may include where the pocket extends into the frame in a direction parallel to the axis of rotation.

Alternatively or additionally, in any combination, the rotational cutting blade assembly may include where the cutting boundary lies on a plane that is normal to the axis of rotation.

In another aspect, a rotational cutting blade configured to rotate about an axis of rotation, the rotational cutting blade including a hub defining the axis of rotation, a first arm extending radially from the hub to define a first distal end, where the first arm includes a first blade mounting point configured to at least partially receive a cutting element therein, where the first blade mounting point includes a first cutting boundary, and where the first cutting boundary is subdivided into at least one access slot and at least one guard, and a second arm extending radially from the hub to define a second distal end, where the second arm includes a second blade mounting point configured to at least partially receive a cutting element, therein, where the second blade mounting point includes a second cutting boundary, and where the second cutting boundary includes at least one access slot and at least one guard.

Alternatively or additionally, in any combination, the rotational cutting blade may include where the at least one guard of the first blade mounting point is positioned at a first radial distance from the axis of rotation, where the at least one guard of the second blade mounting point is positioned at a second radial distance from the axis of rotation, and where the first radial distance is different than the second radial distance.

Alternatively or additionally, in any combination, the rotational cutting blade may include where the at least one guard of the first blade mounting point at least partially radially overlaps an at least one access slot of the second blade mounting point.

Alternatively or additionally, in any combination, the rotational cutting blade may include where the first blade mounting point includes a pocket formed into the first arm, and where the second blade mounting point includes a pocket formed into the second arm.

Alternatively or additionally, in any combination, the rotational cutting blade may include where the first cutting boundary and the second cutting boundary both lie on a plane that is oriented normal to the axis of rotation.

Alternatively or additionally, in any combination, the rotational cutting blade may include where the first cutting boundary of the first blade mounting point at least partially radially overlaps the second cutting boundary of the second blade mounting point.

Alternatively or additionally, in any combination, the rotational cutting blade may include where each access slot of the first blade mounting point and each access slot of the second blade mounting point are no greater than 10 mm in width.

Alternatively or additionally, in any combination, the rotational cutting blade may include where the first arm includes a leading edge and a trailing edge relative to the direction of rotation, and where the at least one access slot of the first blade mounting point is formed into the leading edge.

Alternatively or additionally, in any combination, the rotational cutting blade may include where the second arm includes a leading edge and a trailing edge relative to the direction of rotation, and where the at least one access slot of the second blade mounting point is formed into the leading edge.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
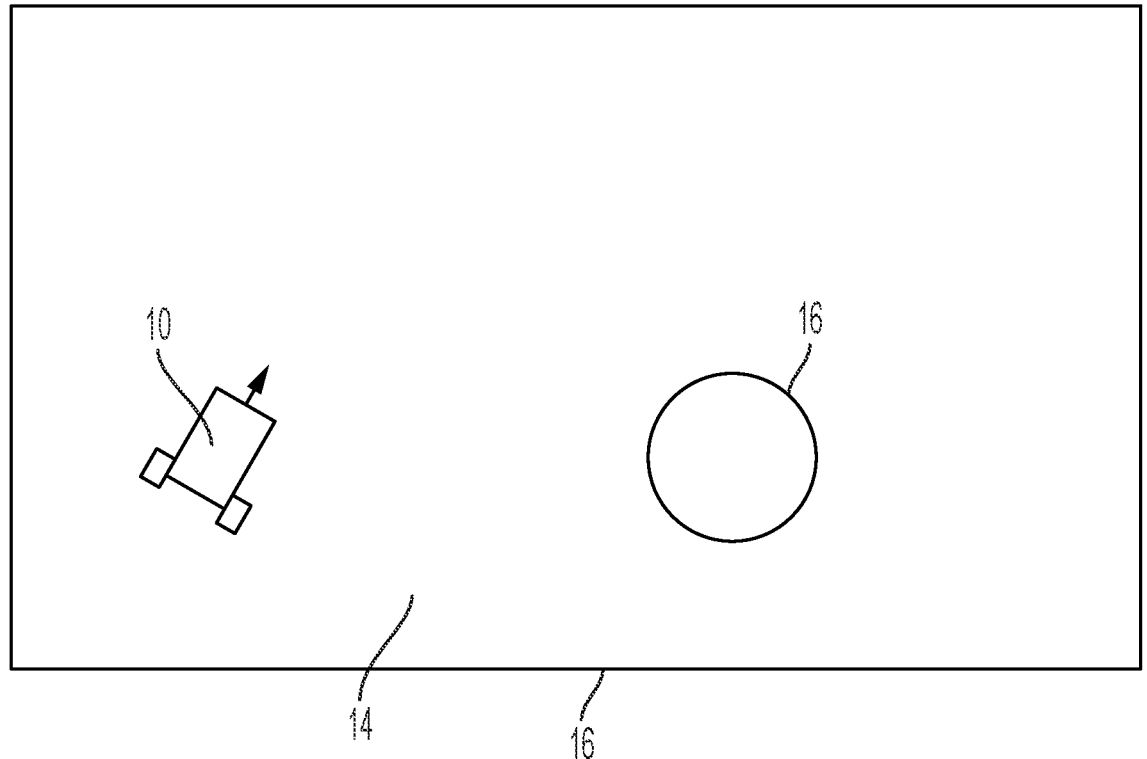
FIG. 1 is a plan view of a robotic garden tool positioned within a cutting area encompassed by a barrier.
Figure 2:
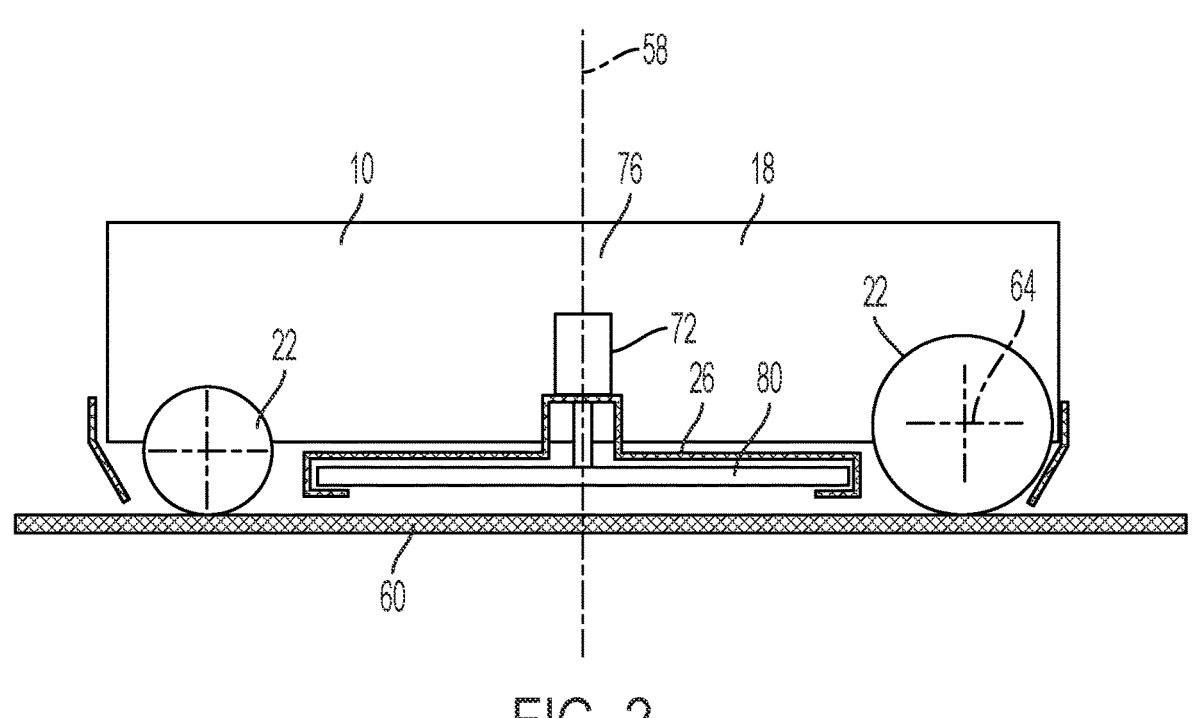
FIG. 2 is a side view of the robotic garden tool of FIG. 1.
Figure 3:
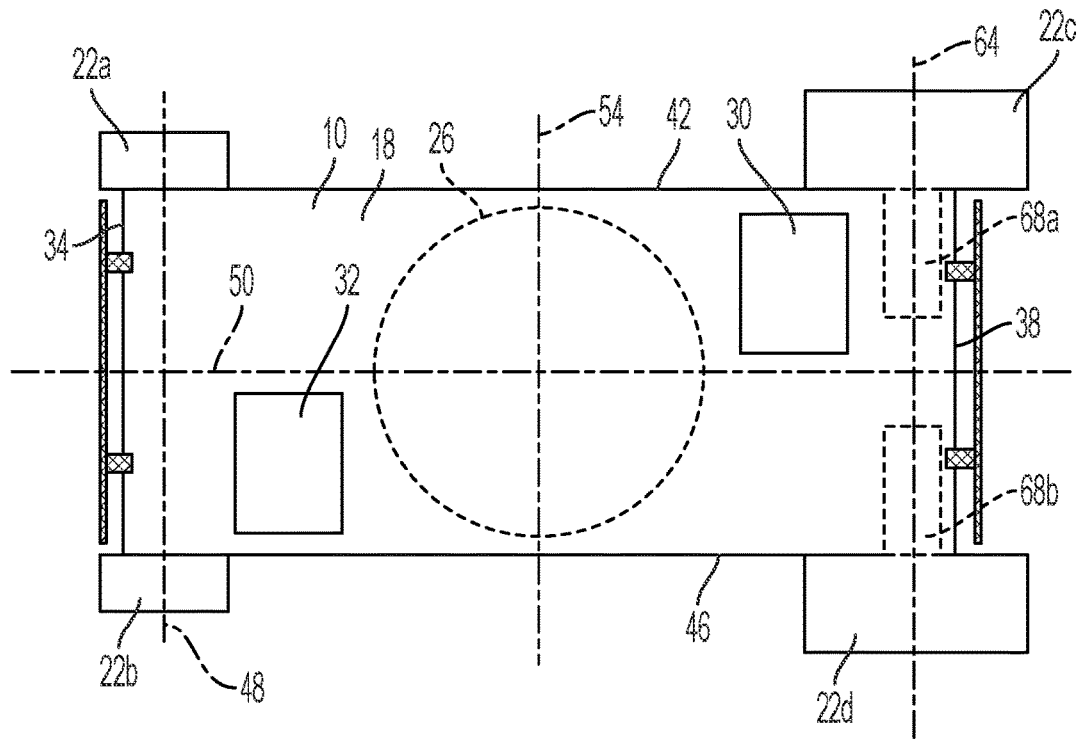
FIG. 3 is a top view of the robotic garden tool of FIG. 1.
Figure 4:
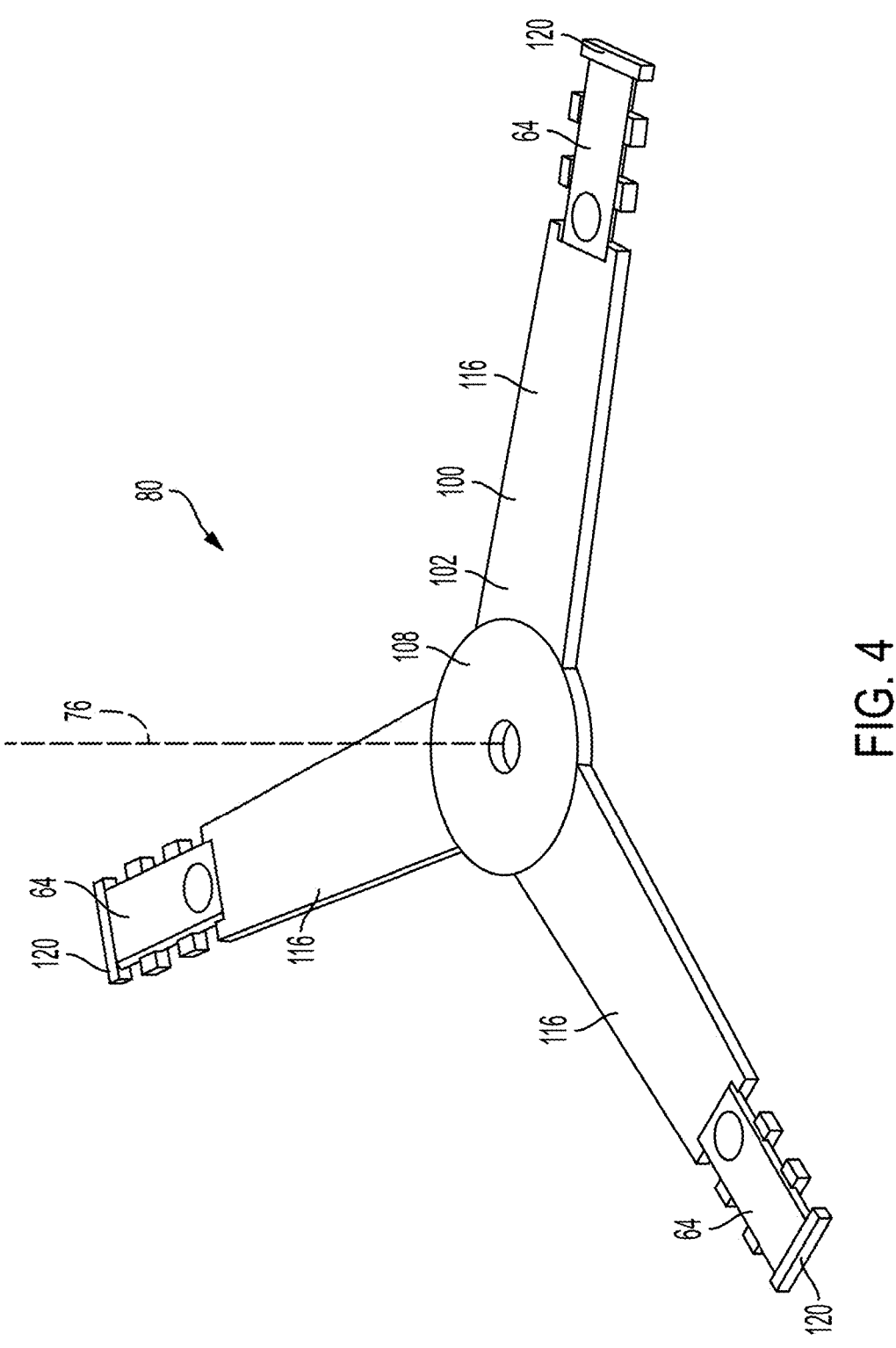
FIG. 4 is a top perspective view of a cutting blade of the robotic garden tool of FIG. 1.

FIGS. 1-3 illustrate a robotic garden tool 10 having a cutting element. More specifically, the illustrated robotic garden tool 10 includes a robotic mower for use to cut vegetation such as grass in an enclosed cutting area 14. The cutting area 14 generally includes, but is not limited to, a continuous area of grass or other vegetation that is enclosed by one or more barriers 16. In the illustrated embodiment, the barriers 16 include a series of electrified wires enclosing the cutting area 14 while in alternative embodiments different form of barrier may be used such as, but not limited to, walls, pavers, virtual barriers created by GPS data points or beacons, and the like. As shown in FIG. 1, such barriers 16 may be used to enclose the overall cutting area 14 and/or to segregate one or more interior regions from the cutting area 14. While the illustrated robotic garden tool 10 is a robotic lawn mower, it is understood that in alternative embodiments the garden tool 10 may include, but is not limited to, other forms of robotic garden tools having cutting blades such as a robotic trimmer, and the like.

As shown in FIGS. 2 and 3, the tool 10 is an electrically powered, self-propelled device that includes a body 18, a plurality of wheels 22 rotatably mounted to the body 18, a cutting assembly 26 mounted to the body 18, a controller 30, and a battery 32. The body 18, in turn, includes a front or first end 34, rear or second end 38 opposite the first end 34, a right or first side 42, and a left or second side 46 opposite the first side 42. The body 18 also defines a longitudinal axis 50 extending along the length of the body 18 and centered between the first side 42 and the second side 46 (e.g., passing through both the first and second ends 34, 38). The body 18 also defines a lateral axis 54 extending along the width of the body 18 and centered between the first and second ends 34, 38 (e.g., passing through both the first and second sides 42, 46). The body 18 also defines a central axis 58 generally positioned at the intersection of the longitudinal and lateral axes 50, 54 and oriented perpendicular to both (e.g., in a generally vertical orientation).

As shown in FIG. 3, the tool 10 includes four wheels 22a, 22b, 22c, 22d, each rotatably coupled to the body 18 and configured to support the tool 10 for self-driven movement along a support surface 60 (e.g., the surface of the cutting area 14). In the illustrated embodiment, the wheels 22a, 22b, 22c, 22d include two steerable, undriven wheels 22a, 22b and two non-steerable, driven wheels 22c, 22d. However, in alternative embodiments, all or any sub-set of the wheels 22 may be driven and all or any sub-set of the wheels 22 may be steerable. Furthermore, while the illustrated steerable wheels are passive in nature (e.g., a caster-style wheel), it is understood that in alternative embodiments the steerable wheels 22a, 22b may be actively driven by the controller 30. In still other embodiments, the tool 10 may include more or fewer wheels 22 positioned in different arrangements about the tool 10. In still other embodiments, the wheels 22 may be replaced by other forms of propulsion such as, but not limited to, tracks, omni-wheels, walking legs, and the like.

The driven wheels 22c, 22d of the tool 10 are positioned proximate the second end 38 of the body 18 and rotate about a common rear axis 64 oriented perpendicular to the longitudinal axis 50. In the illustrated embodiment, each rear wheel 22c, 22d is mounted to and driven by a dedicated electric motor 68a, 68b to provide propulsion for the tool 10 over the support surface 60. In some embodiments, the wheels 22 may be mounted directly to a respective motor 68a, 68b while in other embodiments a gear reduction and the like may be used. In the illustrated embodiment, the driven wheels 22c, 22d are non-steerable. However, in alternative embodiments, the driven wheels 22c, 22d may also be steerable.

FIG. 2 illustrates the cutting assembly 26 of the tool 10. More specifically, the cutting assembly 26 includes a cutting motor 72 mounted to the body 18, and a cutting blade 80 in operable communication with the cutting motor 72 and configured to rotate with respect to the blade guard 84 about a blade axis 76. In some embodiments, the cutting assembly 26 may also include a blade guard 84 to at least partially encompass and restrict access to the cutting blade 80 during use.

As shown in FIGS. 4-7, the cutting blade 80 of the cutting assembly 26 includes frame 100 and one or more blade elements 94 coupled to the frame 100 to produce a radial cutting region 176. During use, the cutting blade 80 is configured to be coupled to the motor 72 for rotation with respect to the body 18 about the blade axis 76.

The frame 100 of the blade 80 includes a central hub 108 defining the blade axis 76, and one or more arms 116 extending radially outwardly from the central hub 108 to define a corresponding distal end 120, a first or leading edge in the direction of rotation, and a second or trailing edge opposite the direction of rotation. The frame 100 also forms a first surface 102 and a second surface 106 opposite the first surface 102. In the illustrated embodiment, both the first and second surfaces 102, 106 are planar to produce a plate-like shape, however, in alternative embodiments one or both surfaces 102, 106 may be curvilinear.

Figure 5:
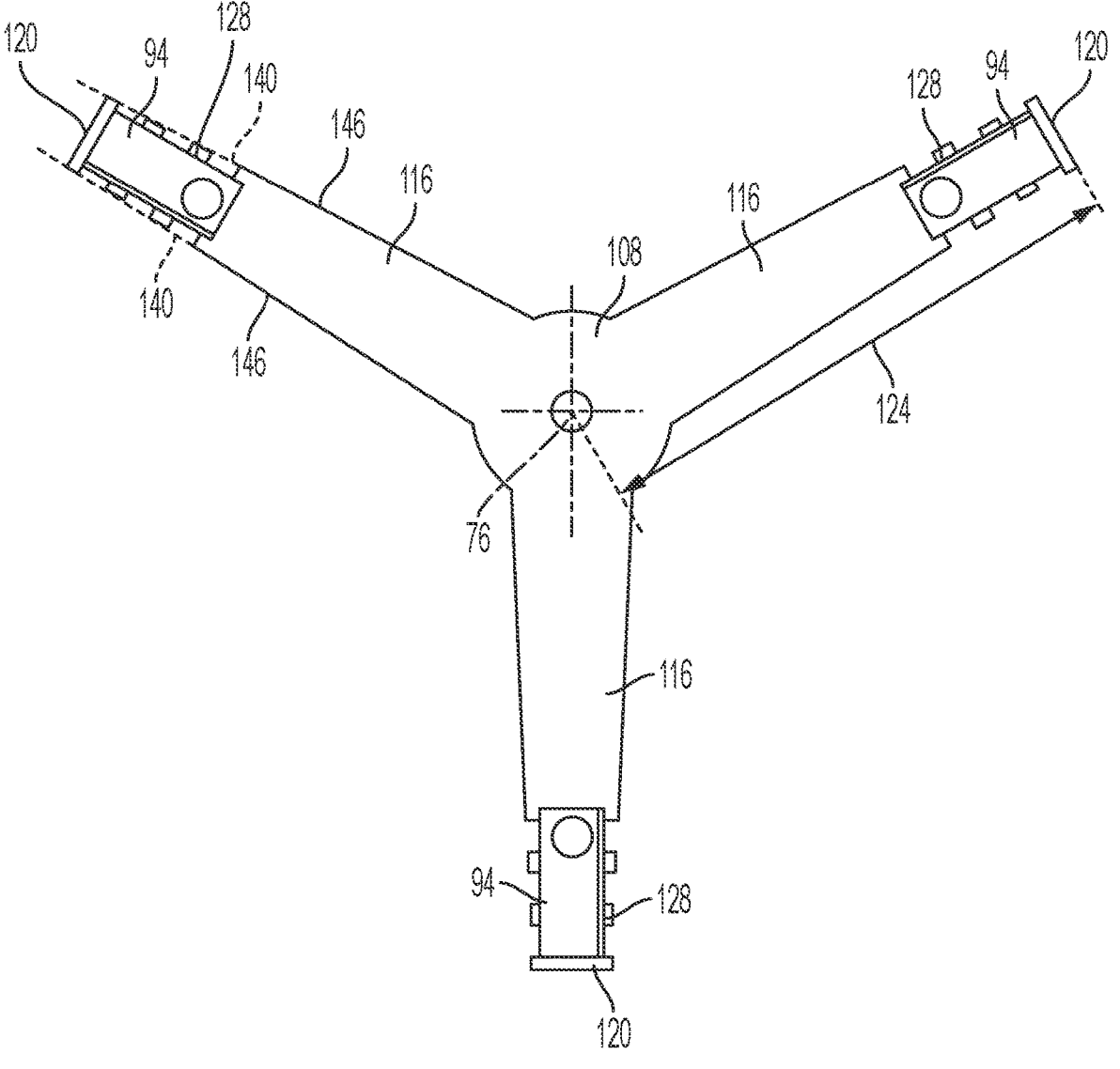
FIG. 5 is a top view of the cutting blade of FIG. 4.
Figure 6:
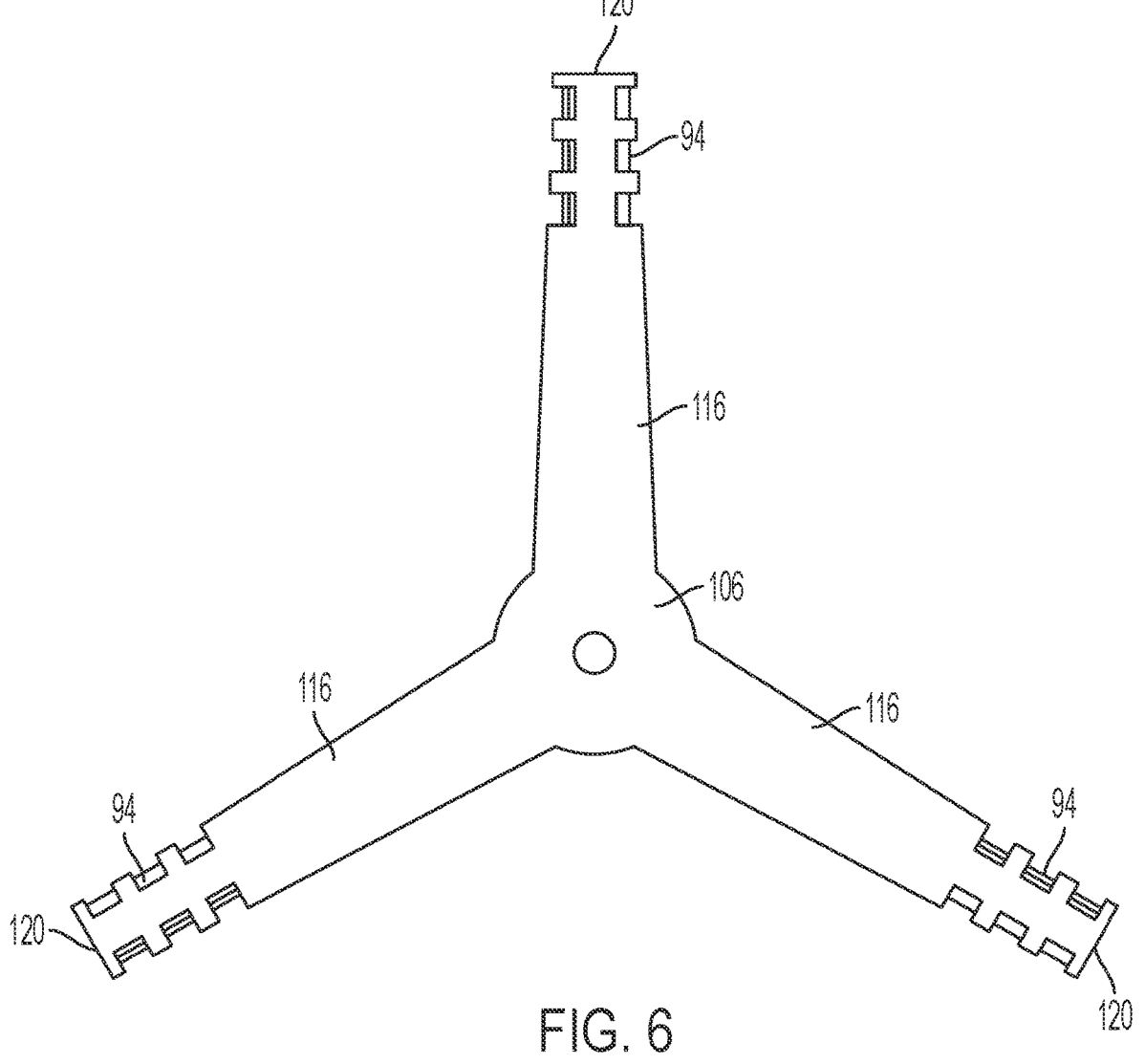
FIG. 6 is a bottom view of the cutting blade of FIG. 4.

As shown in FIG. 5, each arm 116 of the cutting blade 80 extends radially outwardly from the central hub 108 to form a respective distal end 120 to define a corresponding arm radial length 124. Each arm 116 also includes a blade mounting point (BMP) 128 sized and shaped to receive a corresponding blade element 94 therein. In the illustrated embodiment, the frame 100 includes three arms 116 equally spaced from one other and having the same arm radial length 124. However, in alternative embodiments more or fewer arms 116 may be present. In still other embodiments, the arm radial length 124 may vary between each arm 116. For example, in some embodiments a first subset of arms 116 may have a first arm radial length 124 while a second subset of arms 116 may have a second arm radial length 124 different than the first arm radial length 124. In still other embodiments, each arm 116 may have a unique arm radial length 124.

In the illustrated embodiment, each arm 116 is linear in overall shape tapering in width as they extend radially outwardly away from the hub 108 to form a pair of side axes 140 generally corresponding to the lateral edges 146 thereof. However, in alternative embodiments, different width profiles and/or different shapes may be present. For example, the arms 116 may be curved and the like. Furthermore, while each arm 116 has the same shape and width profile, it is understood that in other embodiments each arm 116 or a subset of arms 116 may have a unique shape and/or width profile.

Figure 7:
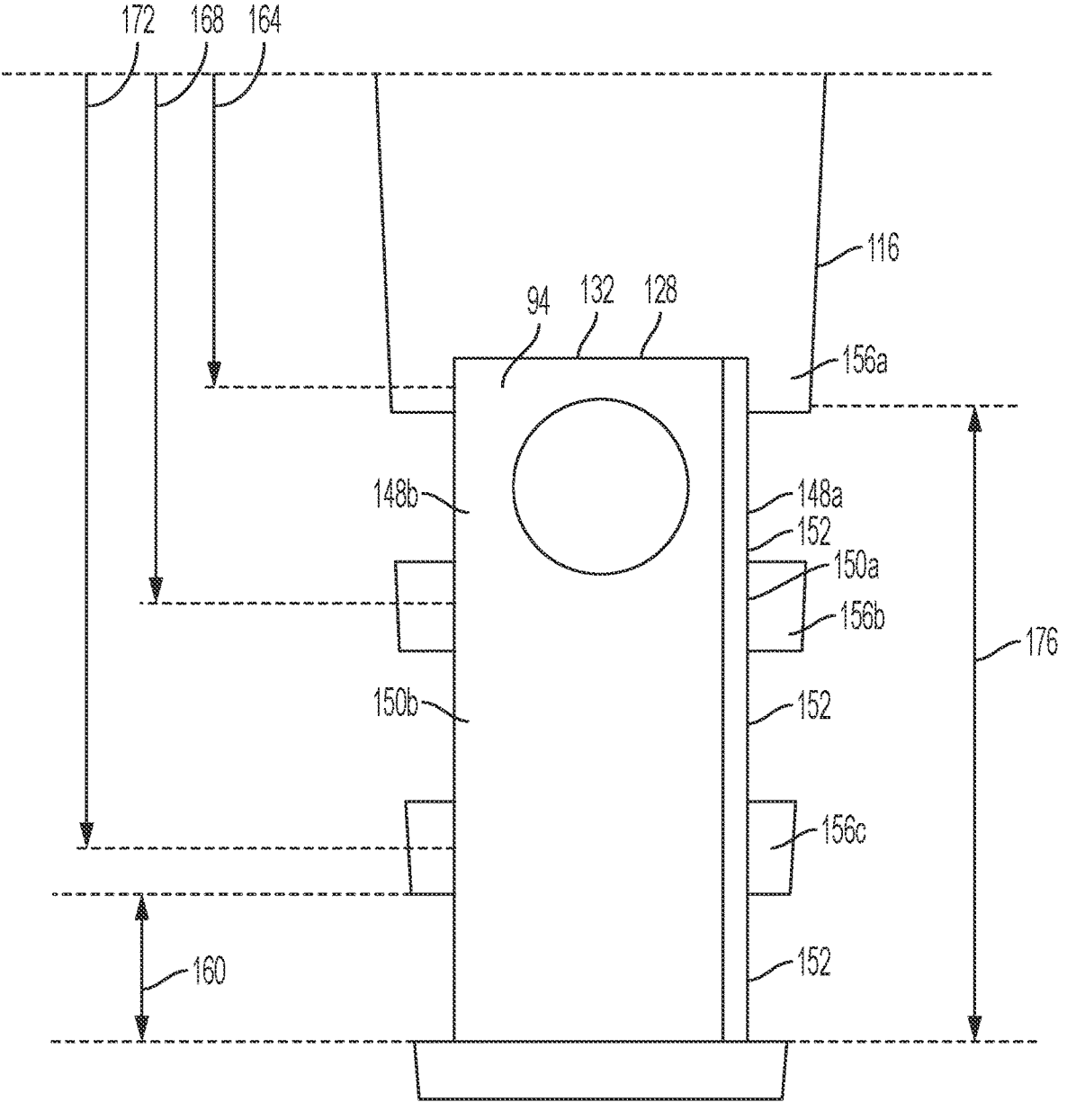
FIG. 7 is a top detailed view of the blade element of the cutting blade of FIG. 4.
Figure 8:
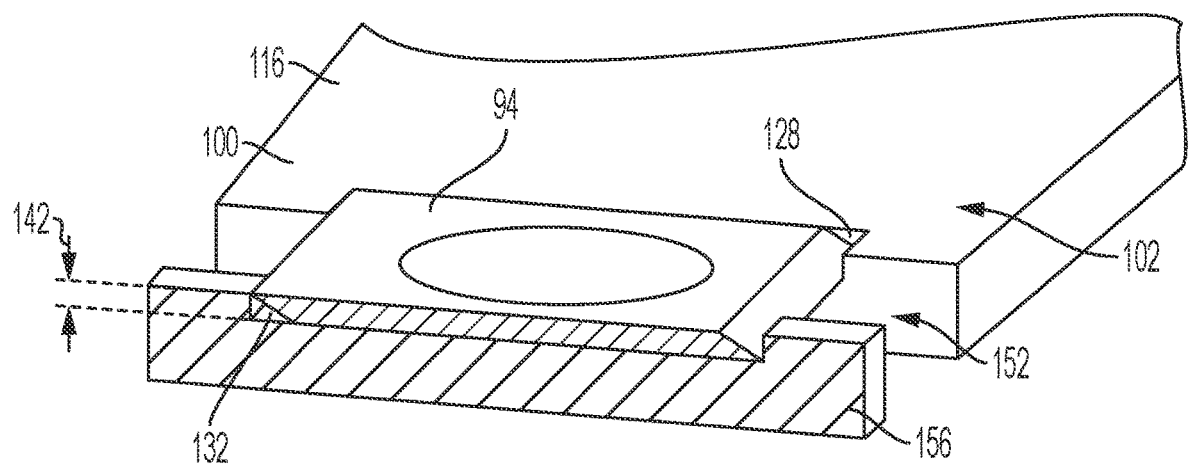
FIG. 8 is a section view taken along line 8-8 of FIG. 7.

As shown in FIG. 7, each arm 116 includes at least one BMP 128 formed integrally therein and sized and shaped to receive a corresponding blade element 94 therein. More specifically, the illustrated BMP 128 includes a pocket 132 formed into one of the first surface 102 and the second surface 106 with a pocket depth 136 generally corresponding to the height 142 of the blade element 94. The pocket 132 also includes one or more cutting boundaries 150 generally corresponding to the boundary of the pocket 132 immediately opposite or adjacent to a cutting edge 148 of the cutting element 94 placed therein. More specifically, the pocket 132 includes a first cutting boundary 150a adjacent the first cutting edge 148a of the blade element 94 and a second cutting boundary 150b adjacent the second cutting edge 148b of the blade element 94. During operation, only one of the first and second cutting edges 148a, 148b of a given cutting element 94 will actually cut vegetation at any given time depending upon the orientation of the cutting blade 80 relative to the body 18 (e.g., whether the blade 80 is installed first surface 102 up or first surface down 102) and the direction of rotation of the blade 80.

In the illustrated embodiment, the pocket 132 is completely positioned within the periphery of the corresponding arm 116 and integrally formed therein. As shown in FIG. 7, the arm radial length 124 is greater than the maximum radial distance of the pocket 132 and the pocket 132 is completely positioned between both edge axes 140.

Figure 9:
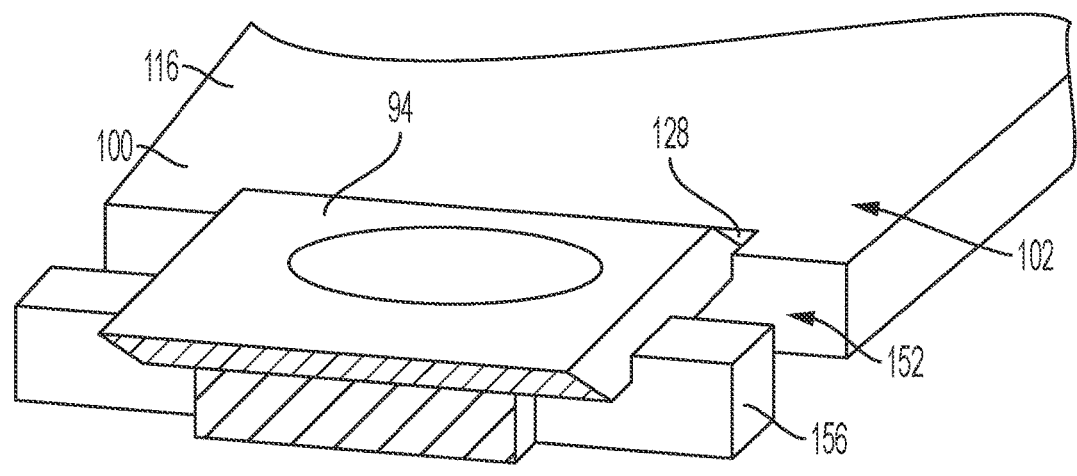
FIG. 9 is a section view taken along line 9-9 of FIG. 7.

The BMP 128 also includes one or more access slots 152 and one or more guards 156 positioned along the cutting boundaries 150a, 150b of the pocket 132. More specifically, each access slot 152 includes a slot formed into the arm 116 and sized to provide access to the corresponding cutting edge 148 of the blade element 94. In the illustrated embodiment, each access slot 152 is open to a lateral edge 146 of the arm 116 and extends circumferentially inwardly therefrom a distance greater than the distance between the lateral edge 146 and the cutting edge 148 of the blade element 94 (see FIG. 9). In contrast, each guard 156 includes a portion of the arm 116 that remains in position adjacent the cutting edge 148 of the blade element 94 to restrict access thereto.

In the illustrated embodiment, each access slot 152 defines an access width 160 that is sized to permit grass to engage the cutting edge 148 of the blade element 94 during use but small enough to restrict access to the blade by a user's fingers, toes, and/or other appendages. More specifically, each access slot 152 of the cutting blade 80 have an access width 160 that is less than or equal to 12 mm. By limiting the maximum width of any given access slot 152, the cutting blade 80 improves safety by restricting access to the sharp portions of the blade 80 (e.g., the cutting edges 148 of the blade element 94) to any items larger than the maximum access width. In some embodiments, the access width 160 is between 3 mm and 12 mm. In other embodiments, the access width 160 may be less than or equal to 10 mm, 8 mm, 6 mm, or 4 mm. In still other embodiments, the access width 160 may be less than 12 mm.

As shown in FIG. 7, the BMP 128 includes three access slots 152 and three guards 156 positioned along both the first and second cutting boundaries 150a, 150b. More specifically, each cutting boundary 150a, 150b of the BMP 128 includes a first guard 156a positioned at a first radial distance 164 from the axis 76, a second guard 156b positioned at a second radial distance 168 from the axis 76, and a third guard 156c positioned at a third radial distance 172 from the axis 76. In the illustrated embodiment, the locations of each guard 156a, 156b, 156c of each arm 116 is located at the same radial distances of the same corresponding guards 156a, 156b, 156b of the remaining arms 116 (e.g., the BMP 128 of each arm 116 is identical). However, in alternative embodiments, the locations and number of the guards 156 in each arm 116 may be staggered to assure that, between all of the arms 116, an un-guarded portion of a cutting edge 148 of a blade element 94 is continuously available over the entire radial cutting region 176 of the blade 80. For example, the guards 156 of the BMPs 128 of blade 80 are positioned so that where a guard 156 is present in one arm 116 at least one access slot 152 is present in another arm 116 over the entire radial cutting region 176. By doing so, the blade 80 is able to include the safety provided by the guards 156 but still assure a complete and unbroken radial cutting region 176 to improve efficiency. In still other embodiments, the guard 156 of one arm 116 is positioned so that it at least partially radially overlaps the access slot 152 of another arm 116. In still other embodiments, the BMPs 128 may all be positioned at the same radial distance from the axis of rotation, in other embodiments, the BMPs 128 may be offset. In still other embodiments, the BMPs 128 may be staggered such that the at least partially radially overlap one another to produce a continuous cutting region 176 that is radially wider than any single given blade 80.

Figure 10:
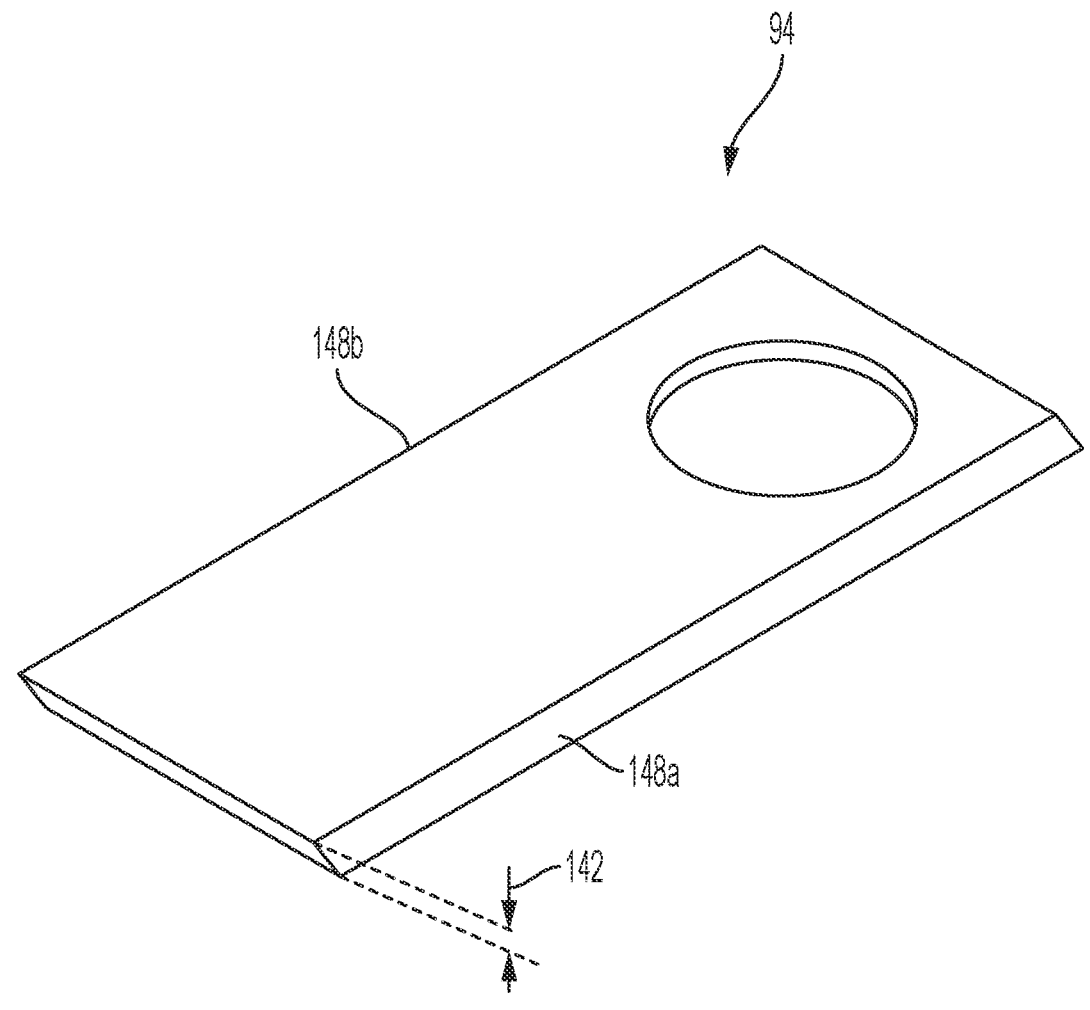
FIG. 10 is a perspective view of the blade element of the cutting blade of FIG. 4.

FIG. 10 illustrates a blade element 94 of the cutting blade 80. The blade element 94 is substantially rectangular in shape and includes a first cutting edge 148a and a second cutting edge 148b opposite the first cutting edge 148a. The cutting blade 80 also defines a blade height 142, a first cutting plane coincident with the first cutting edge 148a and parallel to the bottom surface of the blade element 94, and a second cutting plane coincident with the second cutting edge 148b and parallel to the top surface of the blade element. While the illustrated blade element 94 includes two linear cutting edges 148a, 148b, it is understood that in alternative embodiments different sizes and shapes of blade element 94 may be used having different number and contour of cutting edges thereon.

Figure 11:
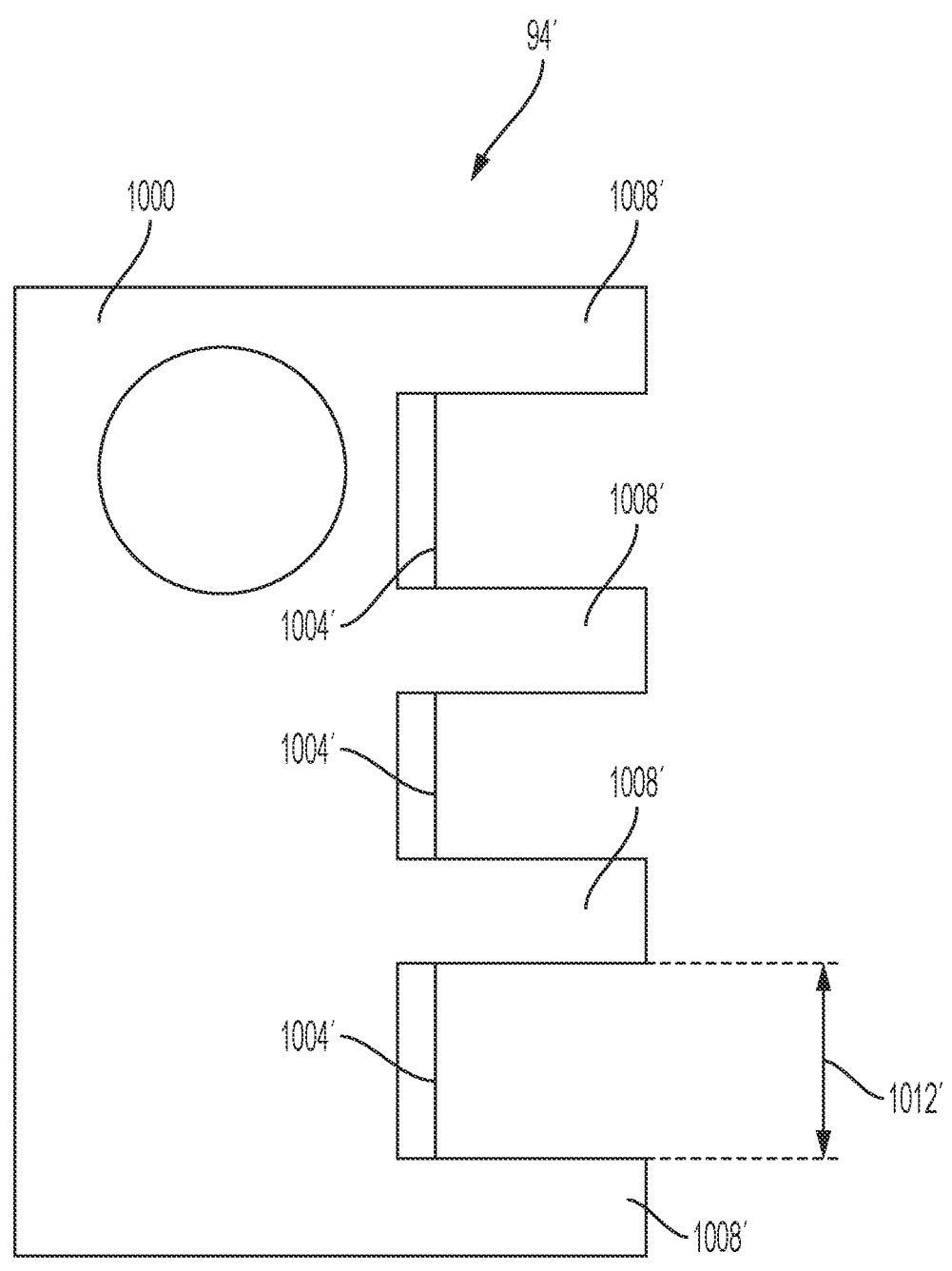
FIG. 11 is a top view of another embodiment of a blade element.

FIG. 11 illustrates another embodiment of a blade element 94'. The blade element 94' includes a body 1000' having a cutting edge 1004' sub-divided by one or more guard prongs 1008' formed integrally therewith and having a blunt or otherwise un-sharpened perimeter. In the illustrated embodiment, each pair of adjacent guard prongs 1008' define a gap distance 1012' therebetween. The gap distance 1012' between each pair of adjacent guard prongs 1008' is large enough to allow grass and other vegetation to gain access to and engage the cutting edge 1004' positioned therebetween but sufficiently small to restrict access to the cutting edge 1004' by a user's fingers, feet, and other appendages. More specifically, each gap distance 1012' of the blade element 94' is less than or equal to 12 mm. In other embodiments, each gap distance 1012' is between 3 mm and 12 mm. In still other embodiments, the gap distance 1012' may be less than or equal to 10 mm, 8 mm, 6 mm, or 4 mm. In still other embodiments, the gap distance 1012' may be less than 12 mm. While the illustrated guard prongs 1008' are formed integrally with the body 1000' of the blade element 94', it is understood that in alternative embodiments the guard prongs 1008' may be molded onto the body 1000' as a separate material.

The controller 30 of the tool 10 includes is in operable communication with the motor 72 and is configured to send and receive signals therefrom. More specifically, the motor 72 is configured to receive signals from the controller 30 indicating the speed and direction of rotation of the blade 80 relative to the body 18 while the controller 30 is configured to receive data from the motor 72 and/or sensors associated with the motor 72 indicating the load exerted on the motor 72. During use, the controller 30 is configured to monitor the load associated with the motor 72 and implement one or more safety protocols upon the detection of the blade 80 hits an unwanted object. More specifically, when the blade 80 hits a hard object (e.g., like a rock and the like) the motor 72 driving the blade 80 experiences a momentary load spike. The controller 30 is configured to detect this load spike and subsequently engage one or more safety protocols in response. Such safety protocols may include, but are not limited to, shutting down the motor 72 (e.g., causing the blade 80 to stop spinning), reduce the blade's speed, shut down the entire tool 10, output an audible or visible signal, and/or output an alarm to a user device.

The invention claimed is:

1. A rotational cutting blade assembly for use with a garden tool, the rotational cutting blade assembly comprising:
   a frame defining an axis of rotation, the frame including a blade mounting point, wherein the blade mounting point includes a cutting boundary, and wherein the cutting boundary is subdivided into at least one access slot and at least one guard; and
   a cutting element configured to be attached to the frame at the blade mounting point, wherein the cutting element includes at least one cutting edge, and wherein the at least one cutting edge is immediately adjacent the cutting boundary of the blade mounting point when the cutting element is attached thereto;
   wherein the blade mounting point includes a pocket formed into the frame, wherein the cutting element is sized and shaped to be at least partially positioned within the pocket, and wherein the pocket extends into the frame in a direction parallel to the axis of rotation such that the cutting element may be inserted into and removed from the pocked in a direction parallel to the axis of rotation.

2. The rotational cutting blade assembly of claim 1, wherein the frame includes a hub defining the axis of rotation, and at least one arm extending radially outwardly from the hub relative to the axis of rotation.

3. The rotational cutting blade assembly of claim 2, wherein the blade mounting point is located in the at least one arm.

4. The rotational cutting blade assembly of claim 3, wherein the arm includes a leading edge and a trailing edge relative to the direction of rotation, and wherein the at least one access slot is formed into the leading edge of the arm.

5. The rotational cutting blade assembly of claim 2, wherein the frame is substantially planar normal to the axis of rotation.

6. The rotational cutting blade assembly of claim 1, wherein each of the at least one access slots are no greater than 12 mm wide.

7. The rotational cutting blade assembly of claim 1, wherein the blade mounting point includes two cutting boundaries, and wherein each cutting boundary is subdivided into at least one access slot and at least one guard.

8. The rotational cutting blade assembly of claim 1, wherein the pocket defines a first pocket depth, and wherein the first pocket depth corresponds to the thickness of the cutting element.

9. The rotational cutting blade assembly of claim 1, wherein the cutting boundary lies on a plane that is normal to the axis of rotation.

10. A rotational cutting blade configured to rotate about an axis of rotation, the rotational cutting blade comprising:
    a hub defining the axis of rotation,
    a first arm extending radially from the hub to define a first distal end, wherein the first arm includes a first blade mounting point configured to at least partially receive a cutting element therein, wherein the first blade mounting point includes a first cutting boundary, and wherein the first cutting boundary is subdivided into at least one access slot and at least one guard;
    a second arm extending radially from the hub to define a second distal end, wherein the second arm includes a second blade mounting point configured to at least partially receive a cutting element, therein, wherein the second blade mounting point includes a second cutting boundary, and wherein the second cutting boundary includes at least one access slot and at least one guard; and
    wherein the at least one guard of the first blade mounting point is positioned over a first range of radial distances from the axis of rotation, wherein the at least one access slot of the second blade mounting point is positioned over a second range of radial distances from the axis of rotation, and wherein the first range of radial distances at least partially overlaps the second range of radial distances.

11. The rotational cutting blade of claim 10, wherein the at least one guard of the first blade mounting point is positioned at a first radial distance from the axis of rotation, wherein the at least one guard of the second blade mounting point is positioned at a second radial distance from the axis of rotation, and wherein the first radial distance is different than the second radial distance.

12. The rotational cutting blade of claim 10, where the first blade mounting point includes a pocket formed into the first arm, and wherein the second blade mounting point includes a pocket formed into the second arm.

13. The rotational cutting blade of claim 10, wherein the first cutting boundary and the second cutting boundary both lie on a plane that is oriented normal to the axis of rotation.

14. The rotational cutting blade of claim 10, wherein the first cutting boundary of the first blade mounting point is positioned over a third range of radial distances from the axis of rotation, wherein the second cutting boundary of the second blade mounting point is positioned over a fourth range of radial distances from the axis of rotation, and wherein the first range of radial distances at least partially overlaps the fourth range of radial distances.

15. The rotational cutting blade of claim 10, wherein each access slot of the first blade mounting point and each access slot of the second blade mounting point are no greater than 10 mm in width.

16. The rotational cutting blade of claim 10, wherein the first arm includes a leading edge and a trailing edge relative to the direction of rotation, and wherein the at least one access slot of the first blade mounting point is formed into the leading edge.

17. The rotational cutting blade of claim 16, wherein the second arm includes a leading edge and a trailing edge relative to the direction of rotation, and wherein the at least one access slot of the second blade mounting point is formed into the leading edge.

\* \* \* \* \*